(12) United States Patent
Zhu et al.

(10) Patent No.: US 11,579,413 B2
(45) Date of Patent: Feb. 14, 2023

(54) OPTICAL IMAGING LENS INCLUDING EIGHT LENSES OF +−++−−+−, +−+−−−+−, +−+−+−+− OR +−+−−++− REFRACTIVE POWERS

(71) Applicant: GENIUS ELECTRONIC OPTICAL (XIAMEN) CO., LTD., Fujian (CN)

(72) Inventors: Qingzhi Zhu, Fujian (CN); Lanlan Zhang, Fujian (CN); Huabin Liao, Fujian (CN)

(73) Assignee: GENIUS ELECTRONIC OPTICAL (XIAMEN) CO., LTD., Xiamen (CN)

( * ) Notice: Subject to any disclaimer, the term of this patent is extended or adjusted under 35 U.S.C. 154(b) by 345 days.

(21) Appl. No.: 16/820,724

(22) Filed: Mar. 17, 2020

(65) Prior Publication Data

US 2021/0191080 A1    Jun. 24, 2021

(30) Foreign Application Priority Data

Dec. 20, 2019   (CN) .......................... 201911326320.5

(51) Int. Cl.
*G02B 13/00* (2006.01)
*G02B 9/64* (2006.01)

(52) U.S. Cl.
CPC .......... *G02B 13/0045* (2013.01); *G02B 9/64* (2013.01)

(58) Field of Classification Search
CPC .............................. G02B 13/0045; G02B 9/64
See application file for complete search history.

(56) References Cited

U.S. PATENT DOCUMENTS

2019/0391365 A1* 12/2019 Son ......................... G02B 7/021
2021/0132336 A1*  5/2021 Chen ...................... G02B 13/18

* cited by examiner

*Primary Examiner* — Wen Huang
(74) *Attorney, Agent, or Firm* — JCIPRNET

(57) ABSTRACT

An optical imaging lens includes a first, a second, a third, a fourth, a fifth, a sixth, a seventh, and an eighth lens elements sequentially arranged on an optical axis from an object side to an image side. Each of the first lens element to the eighth lens element includes an object-side surface facing the object side and allowing imaging rays to pass through and an image-side surface facing the image side and allowing the imaging rays to pass through. The first lens element has positive refracting power. The second lens element has negative refracting power. An optical axis region of an object-side surface of the fifth lens element is concave. An optical axis region of an object-side surface of the sixth lens element is convex. An optical axis region of an image-side surface of the seventh lens element is convex.

20 Claims, 22 Drawing Sheets

| First Embodiment | | | | | | |
|---|---|---|---|---|---|---|
| System Focal Length (EFL)=4.039 mm, Half Field Of View (HFOV)=46.892°, System Length (TTL)=5.399 mm, F-number (Fno)=1.600, Image Height (ImgH)=4.163 mm | | | | | | |
| Device | Surface | Radius (mm) | Thickness (mm) | Refractive Index | Abbe Number | Focal Length (mm) |
| Object | | infinity | infinity | | | |
| Aperture 0 | | infinity | -0.304 | | | |
| First Lens Element 1 | Object-side Surface 15 | 2.346 | 0.533 | 1.544 | 55.951 | 6.497 |
| | Image-side Surface 16 | 6.376 | 0.079 | | | |
| Second Lens Element 2 | Object-side Surface 25 | 3.760 | 0.183 | 1.608 | 26.904 | -12.202 |
| | Image-side Surface 26 | 2.455 | 0.180 | | | |
| Third Lens Element 3 | Object-side Surface 35 | 6.749 | 0.516 | 1.544 | 55.951 | 6.747 |
| | Image-side Surface 36 | -7.884 | 0.128 | | | |
| Fourth Lens Element 4 | Object-side Surface 45 | -17.505 | 0.201 | 1.608 | 26.904 | 170.170 |
| | Image-side Surface 46 | -15.051 | 0.406 | | | |
| Fifth Lens Element 5 | Object-side Surface 55 | -9.839 | 0.370 | 1.544 | 55.951 | -54.171 |
| | Image-side Surface 56 | -14.942 | 0.268 | | | |
| Sixth Lens Element 6 | Object-side Surface 65 | 3.176 | 0.382 | 1.671 | 19.243 | -100.447 |
| | Image-side Surface 66 | 2.887 | 0.193 | | | |
| Seventh Lens Element 7 | Object-side Surface 75 | 4.769 | 0.367 | 1.544 | 55.951 | 4.391 |
| | Image-side Surface 76 | -4.686 | 0.725 | | | |
| Eighth Lens Element 8 | Object-side Surface85 | -3.875 | 0.200 | 1.535 | 55.712 | -2.867 |
| | Image-side Surface86 | 2.599 | 0.300 | | | |
| Filter 9 | Object-side Surface95 | infinity | 0.150 | 1.563 | 51.300 | |
| | Image-side Surface96 | infinity | 0.219 | | | |
| | Image Plane 99 | infinity | | | | |

FIG. 8

| Surface | K | $a_4$ | $a_6$ | $a_8$ | $a_{10}$ |
|---|---|---|---|---|---|
| 15 | 7.995029E-02 | -9.695174E-03 | -1.711727E-03 | -5.977347E-03 | 1.736799E-03 |
| 16 | 1.963096E+01 | -5.640505E-02 | 1.217388E-02 | -8.898715E-03 | 6.068983E-04 |
| 25 | -2.385787E+01 | -4.572590E-02 | 4.149096E-03 | 1.042919E-02 | 6.961999E-04 |
| 26 | -1.718744E+00 | -3.328882E-02 | 1.447659E-02 | 4.954965E-03 | -6.509070E-04 |
| 35 | 2.456671E+01 | 6.248132E-04 | 3.053104E-03 | -1.280098E-02 | 2.769205E-03 |
| 36 | -6.122398E+01 | -5.640227E-02 | 1.729521E-03 | -2.165092E-03 | -2.182101E-03 |
| 45 | -3.648646E+01 | -7.456812E-02 | -1.191071E-02 | -9.942182E-03 | 4.137807E-03 |
| 46 | 5.372252E+01 | -3.432099E-02 | -1.876893E-02 | -3.275475E-04 | 1.236304E-03 |
| 55 | 4.436642E+01 | -1.096030E-02 | -5.093712E-03 | 3.082594E-04 | -2.141211E-03 |
| 56 | 7.978915E+01 | -5.986936E-02 | 9.486690E-03 | -2.532343E-03 | -3.487884E-04 |
| 65 | -2.893677E+00 | -4.910985E-02 | -2.371454E-03 | 2.189003E-03 | -5.270095E-04 |
| 66 | -3.102611E+00 | -4.560092E-02 | -6.124290E-04 | 1.249351E-03 | -1.694451E-04 |
| 75 | -9.494553E+00 | -8.679075E-04 | -6.635324E-03 | -1.126892E-03 | 5.040544E-04 |
| 76 | -2.701173E+01 | 4.793307E-02 | -1.442211E-02 | 6.406251E-05 | 1.974018E-04 |
| 85 | 6.897359E-01 | -4.285246E-02 | 3.791989E-03 | 1.044484E-03 | -1.210838E-05 |
| 86 | -1.172736E+01 | -3.342161E-02 | 7.642654E-03 | -1.254742E-03 | 1.152605E-04 |
| Surface | $a_{12}$ | $a_{14}$ | $a_{16}$ | $a_{18}$ | $a_{20}$ |
| 15 | -7.479844E-04 | -6.013692E-04 | 3.018465E-04 | | |
| 16 | 4.696567E-04 | -1.476413E-04 | -2.732911E-05 | | |
| 25 | -2.341354E-03 | -9.627176E-04 | 7.465938E-04 | | |
| 26 | -9.764539E-04 | -4.736317E-04 | 1.902285E-04 | | |
| 35 | 3.453712E-03 | -1.100554E-04 | -7.921856E-04 | | |
| 36 | 1.847078E-03 | 1.445287E-03 | -7.654527E-04 | | |
| 45 | 3.104328E-03 | 1.012006E-03 | -1.753790E-03 | | |
| 46 | 8.494102E-04 | -3.740137E-04 | -2.101477E-04 | | |
| 55 | -1.704354E-03 | 7.720551E-04 | -7.821968E-05 | | |
| 56 | 1.362105E-04 | -4.701148E-04 | 1.632934E-04 | | |
| 65 | -4.258566E-04 | 1.411201E-04 | 2.366163E-07 | -5.222535E-06 | -9.337210E-10 |
| 66 | -1.216300E-05 | 1.888015E-08 | 4.825913E-07 | 3.542163E-08 | -6.537916E-09 |
| 75 | -8.896151E-05 | 6.594203E-06 | 8.963925E-07 | -8.639017E-08 | -3.731938E-09 |
| 76 | -5.670074E-06 | -3.233027E-07 | -8.682617E-08 | 5.669198E-09 | 3.781690E-10 |
| 85 | -2.514346E-05 | 1.595777E-06 | 3.156138E-08 | 1.348503E-09 | -2.012010E-10 |
| 86 | -5.969511E-06 | 1.296879E-07 | -2.777607E-09 | 9.720890E-10 | -5.883800E-11 |

FIG. 9

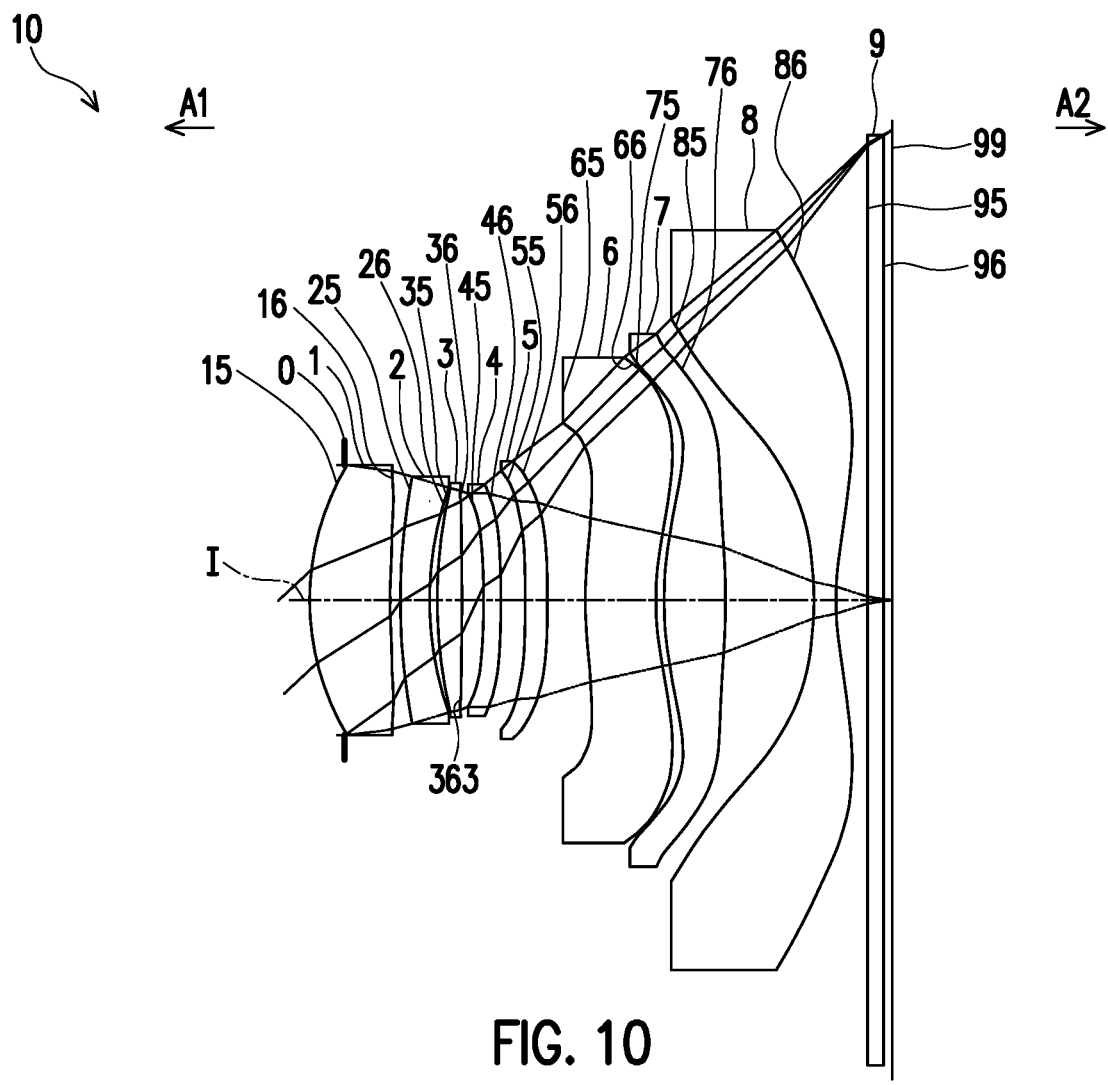
FIG. 10
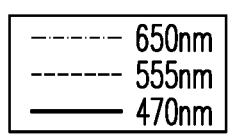
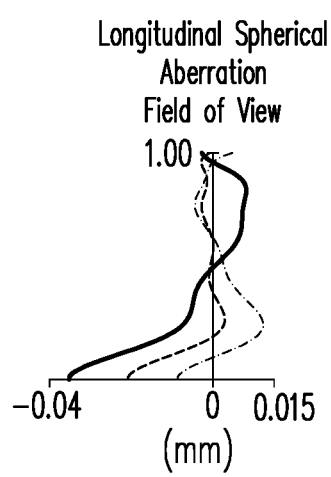
FIG. 11A
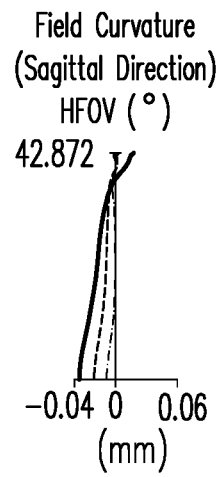
FIG. 11B
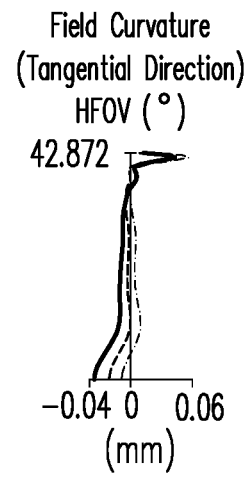
FIG. 11C
FIG. 11D

| Second Embodiment ||||||
|---|---|---|---|---|---|
| EFL = 4.185 mm, HFOV = 42.872°, TTL = 5.530 mm, Fno = 1.600, ImgH = 4.500 mm ||||||
| Device | Surface | Radius (mm) | Thickness (mm) | Refractive Index | Abbe Number | Focal Length (mm) |
| Object | | infinity | infinity | | | |
| Aperture 0 | | infinity | -0.335 | | | |
| First Lens Element 1 | Object-side Surface 15 | 2.246 | 0.770 | 1.544 | 55.951 | 5.633 |
| | Image-side Surface 16 | 7.328 | 0.102 | | | |
| Second Lens Element 2 | Object-side Surface 25 | 4.871 | 0.280 | 1.671 | 19.243 | -13.524 |
| | Image-side Surface 26 | 3.107 | 0.074 | | | |
| Third Lens Element 3 | Object-side Surface 35 | 6.457 | 0.239 | 1.544 | 55.951 | 9.595 |
| | Image-side Surface 36 | -27.336 | 0.207 | | | |
| Fourth Lens Element 4 | Object-side Surface 45 | -12.115 | 0.166 | 1.671 | 19.243 | -313.554 |
| | Image-side Surface 46 | -12.919 | 0.238 | | | |
| Fifth Lens Element 5 | Object-side Surface 55 | -8.930 | 0.211 | 1.544 | 55.951 | -54.144 |
| | Image-side Surface 56 | -12.905 | 0.366 | | | |
| Sixth Lens Element 6 | Object-side Surface 65 | 4.198 | 0.679 | 1.671 | 19.243 | -15.698 |
| | Image-side Surface 66 | 2.813 | 0.080 | | | |
| Seventh Lens Element 7 | Object-side Surface 75 | 3.547 | 0.591 | 1.544 | 55.951 | 4.074 |
| | Image-side Surface 76 | -5.608 | 0.852 | | | |
| Eighth Lens Element 8 | Object-side Surface 85 | -3.851 | 0.214 | 1.535 | 55.712 | -3.192 |
| | Image-side Surface 86 | 3.147 | 0.300 | | | |
| Filter 9 | Object-side Surface 95 | infinity | 0.150 | 1.563 | 51.300 | |
| | Image-side Surface 96 | infinity | 0.010 | | | |
| | Image Plane 99 | infinity | | | | |

FIG. 12

| Surface | K | $a_4$ | $a_6$ | $a_8$ | $a_{10}$ |
|---|---|---|---|---|---|
| 15 | 2.659707E-01 | -1.137853E-02 | 5.219022E-03 | -2.122812E-02 | 2.319565E-02 |
| 16 | 2.071159E+01 | -5.795706E-02 | 1.387221E-02 | 1.855737E-02 | -3.988140E-02 |
| 25 | -3.115219E+01 | -4.218605E-02 | 2.235659E-02 | 4.326582E-02 | -6.452818E-02 |
| 26 | -1.024721E+00 | -1.960200E-02 | -2.721954E-02 | 1.468906E-01 | -2.399312E-01 |
| 35 | 2.517522E+01 | 2.203207E-02 | -2.109205E-02 | -4.110920E-02 | 1.475590E-01 |
| 36 | -1.451874E+04 | -4.615285E-02 | 1.780278E-01 | -4.642556E-01 | 7.564751E-01 |
| 45 | -1.831265E+01 | -5.961211E-02 | -8.172208E-02 | 1.336525E-01 | -1.492307E-01 |
| 46 | -1.801360E+00 | -4.115838E-02 | -7.141390E-02 | 1.245034E-01 | -1.429118E-01 |
| 55 | 4.605468E+01 | -3.230279E-02 | -7.206027E-03 | 1.894924E-02 | -1.389151E-03 |
| 56 | 8.260908E+01 | -8.645939E-02 | 2.324424E-02 | -7.444824E-03 | 5.812444E-03 |
| 65 | -1.263983E+00 | -6.591277E-02 | 1.585653E-02 | -4.191601E-03 | -3.769896E-03 |
| 66 | -3.198374E+00 | -5.431746E-02 | 1.380120E-02 | -4.102370E-03 | -1.464433E-04 |
| 75 | -8.355139E+00 | 3.279694E-03 | -7.860679E-03 | -4.844038E-04 | 4.757607E-04 |
| 76 | -2.461978E+01 | 4.157884E-02 | -8.213514E-03 | -5.835744E-03 | 3.234365E-03 |
| 85 | 6.934019E-01 | -3.776966E-02 | 5.177632E-04 | 2.331427E-03 | -4.985675E-04 |
| 86 | -8.443218E+00 | -3.266291E-02 | 2.453377E-03 | 2.412047E-03 | -1.184651E-03 |
| Surface | $a_{12}$ | $a_{14}$ | $a_{16}$ | $a_{18}$ | $a_{20}$ |
| 15 | -1.641885E-02 | 5.768393E-03 | -8.295751E-04 | | |
| 16 | 2.770387E-02 | -8.742517E-03 | 9.850324E-04 | | |
| 25 | 4.192479E-02 | -1.264589E-02 | 1.625904E-03 | | |
| 26 | 2.120441E-01 | -1.068619E-01 | 2.616400E-02 | | |
| 35 | -2.246078E-01 | 1.560048E-01 | -3.796529E-02 | | |
| 36 | -7.604550E-01 | 4.276592E-01 | -9.934774E-02 | | |
| 45 | 6.991395E-02 | 1.802259E-03 | -7.163285E-03 | | |
| 46 | 9.033879E-02 | -2.806163E-02 | 3.344455E-03 | | |
| 55 | -2.050528E-02 | 1.292792E-02 | -2.380825E-03 | | |
| 56 | -6.779972E-03 | 1.737048E-03 | 4.368095E-05 | | |
| 65 | 4.915773E-03 | -2.800646E-03 | 7.647404E-04 | -8.174534E-05 | -8.775152E-07 |
| 66 | 7.849429E-04 | -3.624240E-04 | 8.163328E-05 | -9.341880E-06 | 4.302522E-07 |
| 75 | -2.820413E-04 | 1.049101E-04 | -2.075794E-05 | 2.210175E-06 | -9.932501E-08 |
| 76 | -9.041475E-04 | 1.588228E-04 | -1.692762E-05 | 1.003951E-06 | -2.565311E-08 |
| 85 | 9.148980E-05 | -1.515917E-05 | 1.520414E-06 | -8.012638E-08 | 2.012616E-09 |
| 86 | 2.492726E-04 | -2.867823E-05 | 1.876896E-06 | -6.579238E-08 | 9.612040E-10 |

FIG. 13

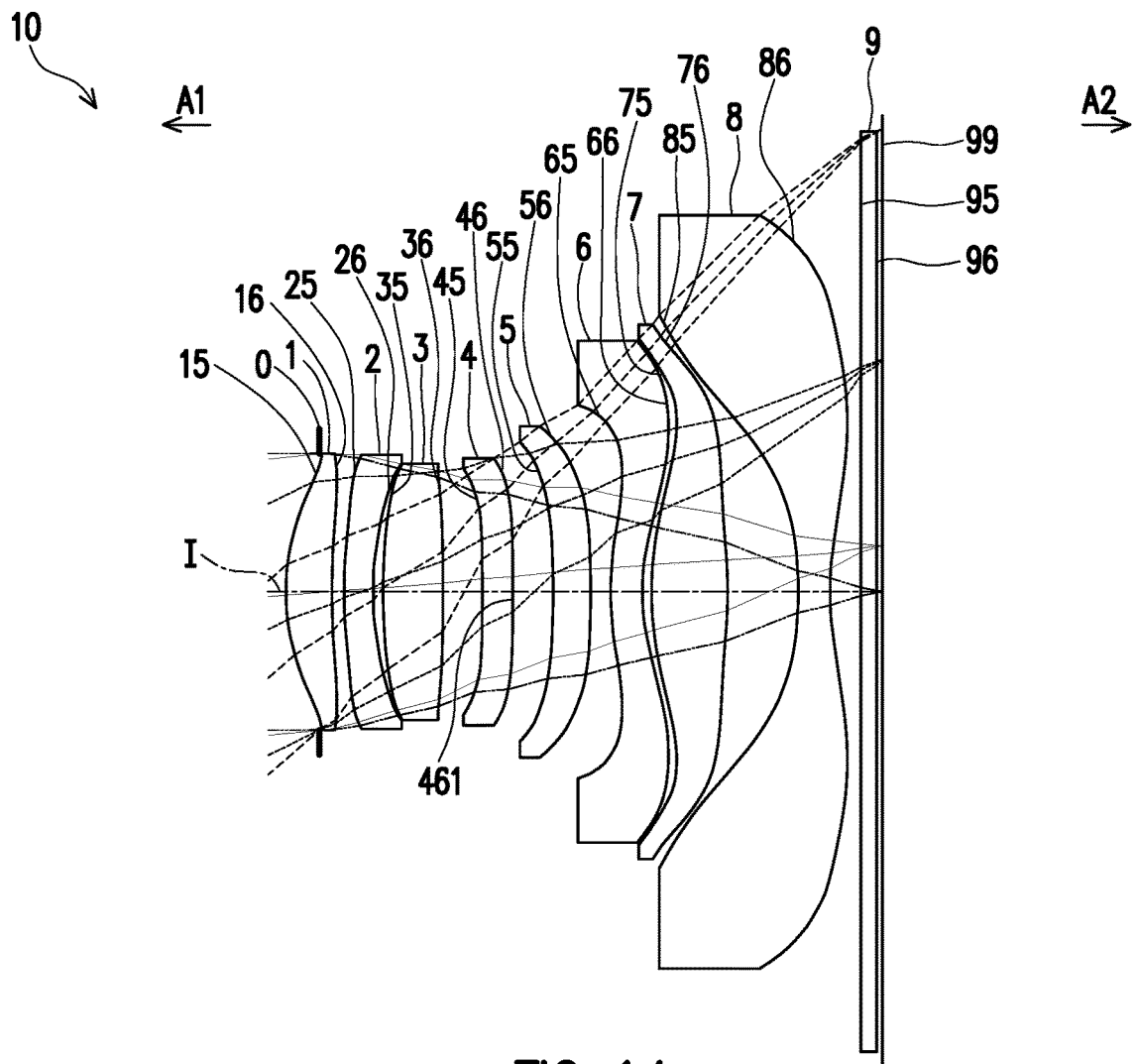
FIG. 14
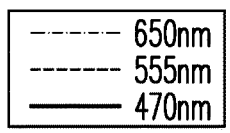
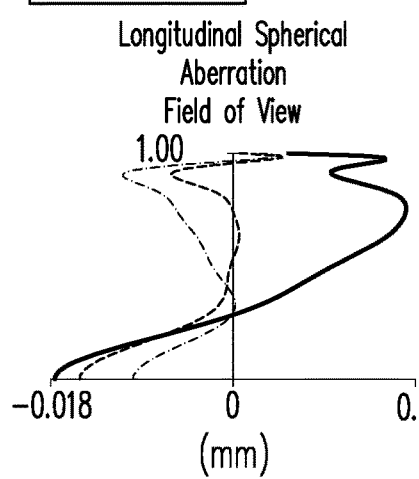
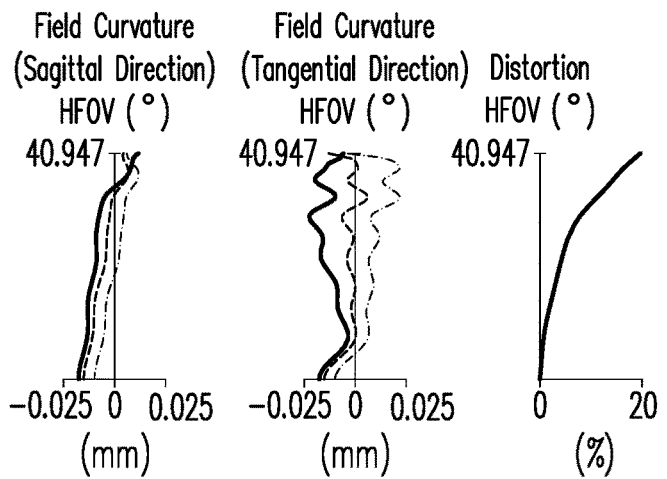
FIG. 15A  FIG. 15B  FIG. 15C  FIG. 15D

| Third Embodiment |||||||
|---|---|---|---|---|---|---|
| EFL = 4.307 mm, HFOV = 40.947°, TTL = 5.752 mm, Fno = 1.600, ImgH = 4.500 mm |||||||
| Device | Surface | Radius (mm) | Thickness (mm) | Refractive Index | Abbe Number | Focal Length (mm) |
| Object | | infinity | infinity | | | |
| Aperture 0 | | infinity | -0.322 | | | |
| First Lens Element 1 | Object-side Surface 15 | 2.226 | 0.445 | 1.544 | 55.951 | 5.762 |
| | Image-side Surface 16 | 7.080 | 0.119 | | | |
| Second Lens Element 2 | Object-side Surface 25 | 4.533 | 0.280 | 1.671 | 19.243 | -13.344 |
| | Image-side Surface 26 | 2.944 | 0.093 | | | |
| Third Lens Element 3 | Object-side Surface 35 | 6.005 | 0.581 | 1.544 | 55.951 | 8.617 |
| | Image-side Surface 36 | -20.937 | 0.383 | | | |
| Fourth Lens Element 4 | Object-side Surface 45 | -725.496 | 0.293 | 1.671 | 19.243 | -56.152 |
| | Image-side Surface 46 | 40.157 | 0.397 | | | |
| Fifth Lens Element 5 | Object-side Surface 55 | -9.970 | 0.362 | 1.671 | 19.243 | -40.204 |
| | Image-side Surface 56 | -15.957 | 0.193 | | | |
| Sixth Lens Element 6 | Object-side Surface 65 | 2.829 | 0.309 | 1.671 | 19.243 | -15.005 |
| | Image-side Surface 66 | 2.115 | 0.089 | | | |
| Seventh Lens Element 7 | Object-side Surface 75 | 3.179 | 0.734 | 1.544 | 55.951 | 3.678 |
| | Image-side Surface 76 | -5.003 | 0.688 | | | |
| Eighth Lens Element 8 | Object-side Surface 85 | -3.851 | 0.307 | 1.535 | 55.712 | -3.066 |
| | Image-side Surface 86 | 2.955 | 0.300 | | | |
| Filter 9 | Object-side Surface 95 | infinity | 0.150 | 1.563 | 51.300 | |
| | Image-side Surface 96 | infinity | 0.030 | | | |
| | Image Plane 99 | infinity | | | | |

FIG. 16

| Surface | K | $a_4$ | $a_6$ | $a_8$ | $a_{10}$ |
|---|---|---|---|---|---|
| 15 | 1.765321E-01 | -4.659042E-03 | -1.672588E-03 | -5.406275E-03 | 8.197879E-04 |
| 16 | 2.049012E+01 | -4.184044E-02 | 2.090497E-02 | -1.711675E-02 | 1.296342E-03 |
| 25 | -3.169405E+01 | -2.892292E-02 | 1.268814E-02 | 2.118853E-02 | -4.105342E-02 |
| 26 | -1.882770E+00 | -3.550642E-02 | 2.955931E-02 | -2.310695E-02 | 4.104262E-02 |
| 35 | 1.826376E+01 | -3.863228E-03 | 1.225199E-02 | -7.103875E-02 | 1.371248E-01 |
| 36 | 8.999997E+01 | -5.130760E-03 | -1.179700E-02 | 2.741738E-02 | -4.969949E-02 |
| 45 | -9.900000E+01 | -6.607770E-02 | 7.662357E-03 | -6.488984E-02 | 8.965247E-02 |
| 46 | -9.000004E+01 | -5.424767E-02 | 6.007412E-03 | -2.941619E-02 | 2.760491E-02 |
| 55 | 4.207181E+01 | -3.704231E-02 | 2.771070E-02 | -3.782168E-02 | 3.671803E-02 |
| 56 | 7.302900E+01 | -6.536343E-02 | 6.083634E-03 | -9.953133E-04 | 4.671600E-03 |
| 65 | -3.475804E+00 | -6.047308E-02 | 1.492439E-02 | -4.358850E-02 | 6.506679E-02 |
| 66 | -3.727903E+00 | -3.919795E-02 | 3.647487E-03 | -2.586212E-03 | 2.224123E-03 |
| 75 | -6.831684E+00 | 1.274013E-03 | -2.438195E-03 | -3.268053E-03 | 2.134418E-03 |
| 76 | -2.350738E+01 | 4.174287E-02 | -1.170329E-02 | -1.842715E-03 | 1.388086E-03 |
| 85 | 6.900006E-01 | -4.059531E-02 | 2.074140E-03 | 1.836653E-03 | -4.941378E-04 |
| 86 | -7.679815E+00 | -4.375741E-02 | 1.790715E-02 | -6.752676E-03 | 1.652178E-03 |
| Surface | $a_{12}$ | $a_{14}$ | $a_{16}$ | $a_{18}$ | $a_{20}$ |
| 15 | 1.207379E-03 | -3.719415E-03 | 1.258707E-03 | | |
| 16 | 1.072745E-03 | -4.073964E-04 | 8.983512E-05 | | |
| 25 | 3.708022E-02 | -1.436885E-02 | 2.015397E-03 | | |
| 26 | -5.975462E-02 | 4.793654E-02 | -1.334030E-02 | | |
| 35 | -1.583503E-01 | 9.961672E-02 | -2.383774E-02 | | |
| 36 | 4.992375E-02 | -2.498926E-02 | 5.483816E-03 | | |
| 45 | -7.713997E-02 | 3.711239E-02 | -7.226181E-03 | | |
| 46 | -1.870237E-02 | 8.618945E-03 | -1.719554E-03 | | |
| 55 | -2.760233E-02 | 1.145960E-02 | -1.863205E-03 | | |
| 56 | -5.884215E-03 | 2.598879E-03 | -3.966870E-04 | | |
| 65 | -5.566327E-02 | 2.891735E-02 | -9.066798E-03 | 1.577582E-03 | -1.176394E-04 |
| 66 | -8.825508E-04 | 1.796009E-04 | -1.845287E-05 | 7.326874E-07 | 3.907232E-09 |
| 75 | -8.474204E-04 | 2.117838E-04 | -3.175961E-05 | 2.652493E-06 | -9.485323E-08 |
| 76 | -4.530003E-04 | 9.990229E-05 | -1.360715E-05 | 1.029063E-06 | -3.314093E-08 |
| 85 | 1.507639E-04 | -3.526192E-05 | 4.571622E-06 | -3.093176E-07 | 8.985087E-09 |
| 86 | -2.460549E-04 | 2.254010E-05 | -1.257913E-06 | 3.967273E-08 | -5.470390E-10 |

FIG. 17

| Fourth Embodiment |||||||
|---|---|---|---|---|---|---|
| | EFL = 4.109 mm, HFOV = 42.641°, TTL = 5.509 mm, Fno = 1.600, ImgH = 4.500 mm |
| Device | Surface | Radius (mm) | Thickness (mm) | Refractive Index | Abbe Number | Focal Length (mm) |
| Object | | infinity | infinity | | | |
| Aperture 0 | | infinity | -0.288 | | | |
| First Lens Element 1 | Object-side Surface 15 | 2.254 | 0.432 | 1.544 | 55.951 | 5.854 |
| | Image-side Surface 16 | 7.132 | 0.038 | | | |
| Second Lens Element 2 | Object-side Surface 25 | 4.171 | 0.160 | 1.671 | 19.243 | -13.939 |
| | Image-side Surface 26 | 2.848 | 0.107 | | | |
| Third Lens Element 3 | Object-side Surface 35 | 6.743 | 0.336 | 1.544 | 55.951 | 10.442 |
| | Image-side Surface 36 | -36.114 | 0.207 | | | |
| Fourth Lens Element 4 | Object-side Surface 45 | -32.727 | 0.186 | 1.671 | 19.243 | 704.089 |
| | Image-side Surface 46 | -30.696 | 0.332 | | | |
| Fifth Lens Element 5 | Object-side Surface 55 | -9.575 | 0.393 | 1.544 | 55.951 | -69.034 |
| | Image-side Surface 56 | -13.025 | 0.044 | | | |
| Sixth Lens Element 6 | Object-side Surface 65 | 3.062 | 0.268 | 1.671 | 19.243 | -28.927 |
| | Image-side Surface 66 | 2.555 | 0.147 | | | |
| Seventh Lens Element 7 | Object-side Surface 75 | 29.249 | 0.479 | 1.544 | 55.951 | 4.307 |
| | Image-side Surface 76 | -2.541 | 0.943 | | | |
| Eighth Lens Element 8 | Object-side Surface 85 | -4.762 | 0.844 | 1.535 | 55.712 | -3.566 |
| | Image-side Surface 86 | 3.400 | 0.300 | | | |
| Filter 9 | Object-side Surface 95 | infinity | 0.150 | 1.563 | 51.300 | |
| | Image-side Surface 96 | infinity | 0.143 | | | |
| | Image Plane 99 | infinity | | | | |

FIG. 20

| Surface | K | $a_4$ | $a_6$ | $a_8$ | $a_{10}$ |
|---|---|---|---|---|---|
| 15 | 6.078743E-02 | -9.904741E-03 | 1.416653E-02 | -4.723671E-02 | 5.084912E-02 |
| 16 | 2.089541E+01 | -5.830535E-02 | 1.215394E-01 | -2.992196E-01 | 3.900172E-01 |
| 25 | -2.347265E+01 | -5.309282E-02 | 2.128810E-01 | -5.332653E-01 | 7.341568E-01 |
| 26 | -1.501268E+00 | -5.187352E-02 | 1.433859E-01 | -2.719085E-01 | 2.727102E-01 |
| 35 | 2.398783E+01 | -2.921447E-02 | 6.015631E-02 | -5.366131E-02 | -4.846045E-02 |
| 36 | -8.933960E+02 | -2.472003E-02 | 1.689124E-03 | 5.337928E-02 | -1.139041E-01 |
| 45 | -7.746630E+02 | -7.224724E-02 | 5.495385E-03 | -1.393568E-02 | -3.433728E-02 |
| 46 | 6.538795E+01 | -5.663920E-02 | -1.690439E-02 | 2.415456E-02 | -7.553206E-02 |
| 55 | 4.868540E+01 | 7.735948E-03 | -1.697058E-02 | -5.494058E-02 | 9.499849E-02 |
| 56 | 8.186359E+01 | 4.087730E-02 | -1.953313E-01 | 2.460359E-01 | -2.159503E-01 |
| 65 | -3.913369E+00 | -4.773299E-02 | -8.200736E-02 | 7.745311E-02 | 1.225965E-02 |
| 66 | -4.384889E+00 | -4.868256E-02 | -4.427395E-02 | 6.803588E-02 | -4.575850E-02 |
| 75 | -4.405636E+02 | 3.248890E-02 | -9.987687E-02 | 1.438906E-01 | -1.319804E-01 |
| 76 | -7.635122E+00 | -3.211326E-03 | -3.450958E-02 | 7.495477E-02 | -6.786349E-02 |
| 85 | 4.361187E+00 | -4.473782E-02 | 3.532737E-02 | -9.115359E-02 | 1.082652E-01 |
| 86 | -4.947593E+00 | -1.860746E-03 | -1.548200E-02 | 7.682389E-03 | -1.937352E-03 |
| Surface | $a_{12}$ | $a_{14}$ | $a_{16}$ | $a_{18}$ | $a_{20}$ |
| 15 | -3.410482E-02 | 1.067440E-02 | -1.212254E-03 | | |
| 16 | -2.762303E-01 | 9.984810E-02 | -1.454888E-02 | | |
| 25 | -5.371373E-01 | 2.005588E-01 | -2.989698E-02 | | |
| 26 | -1.188654E-01 | 9.748475E-03 | 5.468169E-03 | | |
| 35 | 1.197861E-01 | -6.889524E-02 | 1.281489E-02 | | |
| 36 | 1.050863E-01 | -3.967249E-02 | 4.396293E-03 | | |
| 45 | 5.180886E-02 | -2.629422E-02 | 5.789874E-03 | | |
| 46 | 8.132407E-02 | -3.805206E-02 | 7.502361E-03 | | |
| 55 | -9.397164E-02 | 4.859471E-02 | -9.849830E-03 | | |
| 56 | 1.059808E-01 | -2.570411E-02 | 2.233541E-03 | | |
| 65 | -8.801520E-02 | 7.818586E-02 | -3.333108E-02 | 7.302719E-03 | -6.807372E-04 |
| 66 | 1.216969E-02 | 1.892880E-03 | -2.044034E-03 | 4.848344E-04 | -4.000636E-05 |
| 75 | 7.360285E-02 | -2.483870E-02 | 4.721053E-03 | -4.027469E-04 | 4.348035E-06 |
| 76 | 3.607408E-02 | -1.220498E-02 | 2.535119E-03 | -2.850914E-04 | 1.254540E-05 |
| 85 | -7.049563E-02 | 2.730322E-02 | -6.304354E-03 | 8.039075E-04 | -4.366982E-05 |
| 86 | 2.940180E-04 | -2.784950E-05 | 1.609738E-06 | -5.196078E-08 | 7.185220E-10 |

FIG. 21

| Fifth Embodiment ||||||
|---|---|---|---|---|---|
| EFL = 4.238 mm, HFOV = 43.136°, TTL = 5.560 mm, Fno = 1.600, ImgH = 4.500 mm ||||||
| Device | Surface | Radius (mm) | Thickness (mm) | Refractive Index | Abbe Number | Focal Length (mm) |
| Object | | infinity | infinity | | | |
| Aperture 0 | | infinity | -0.319 | | | |
| First Lens Element 1 | Object-side Surface 15 | 2.213 | 0.544 | 1.544 | 55.951 | 5.718 |
| | Image-side Surface 16 | 6.951 | 0.102 | | | |
| Second Lens Element 2 | Object-side Surface 25 | 3.874 | 0.193 | 1.671 | 19.243 | -13.983 |
| | Image-side Surface 26 | 2.694 | 0.122 | | | |
| Third Lens Element 3 | Object-side Surface 35 | 6.739 | 0.462 | 1.544 | 55.951 | 10.715 |
| | Image-side Surface 36 | -43.094 | 0.166 | | | |
| Fourth Lens Element 4 | Object-side Surface 45 | -83.182 | 0.244 | 1.671 | 19.243 | -45.318 |
| | Image-side Surface 46 | 48.729 | 0.261 | | | |
| Fifth Lens Element 5 | Object-side Surface 55 | -16.250 | 0.392 | 1.544 | 55.951 | 159.687 |
| | Image-side Surface 56 | -13.813 | 0.275 | | | |
| Sixth Lens Element 6 | Object-side Surface 65 | 2.606 | 0.356 | 1.671 | 19.243 | -109.806 |
| | Image-side Surface 66 | 2.379 | 0.194 | | | |
| Seventh Lens Element 7 | Object-side Surface 75 | 4.393 | 0.495 | 1.544 | 55.951 | 4.609 |
| | Image-side Surface 76 | -5.649 | 0.736 | | | |
| Eighth Lens Element 8 | Object-side Surface 85 | -3.850 | 0.439 | 1.535 | 55.712 | -3.064 |
| | Image-side Surface 86 | 2.987 | 0.300 | | | |
| Filter 9 | Object-side Surface 95 | infinity | 0.150 | 1.563 | 51.300 | |
| | Image-side Surface 96 | infinity | 0.127 | | | |
| | Image Plane 99 | infinity | | | | |

FIG. 24

| Surface | K | $a_4$ | $a_6$ | $a_8$ | $a_{10}$ |
|---|---|---|---|---|---|
| 15 | 1.152842E-01 | -8.957457E-03 | 3.500346E-04 | -1.543013E-02 | 1.542205E-02 |
| 16 | 1.948443E+01 | -5.182720E-02 | 1.987384E-02 | -2.104319E-02 | 2.015415E-02 |
| 25 | -2.386473E+01 | -1.888643E-02 | -1.605311E-02 | 6.657714E-02 | -6.157760E-02 |
| 26 | -1.645923E+00 | -1.900936E-02 | -4.283884E-03 | 1.753040E-02 | 1.568053E-02 |
| 35 | 2.429837E+01 | 1.317690E-02 | -7.307325E-03 | -5.065807E-02 | 1.066384E-01 |
| 36 | -8.654515E+01 | -1.236822E-02 | 6.236608E-03 | -4.102356E-02 | 6.468125E-02 |
| 45 | 1.300890E+03 | -6.641909E-02 | -4.595401E-02 | 8.949758E-02 | -1.705446E-01 |
| 46 | -1.222801E+03 | -4.792211E-02 | -4.018428E-02 | 7.712941E-02 | -1.198363E-01 |
| 55 | 5.498885E+01 | -2.137409E-02 | -2.736790E-02 | 4.917847E-02 | -6.668885E-02 |
| 56 | 7.832598E+01 | -6.148133E-02 | -2.266189E-02 | 5.813530E-02 | -6.132509E-02 |
| 65 | -3.143540E+00 | -5.646033E-02 | -1.249293E-02 | 3.105208E-02 | -2.986354E-02 |
| 66 | -3.212327E+00 | -5.077371E-02 | -7.333136E-03 | 1.890303E-02 | -1.504626E-02 |
| 75 | -9.226245E+00 | -8.140798E-04 | 1.287521E-03 | -1.599104E-02 | 1.485754E-02 |
| 76 | -2.979406E+01 | 3.707798E-02 | 3.784819E-03 | -1.899983E-02 | 1.167336E-02 |
| 85 | 7.247015E-01 | -4.271221E-02 | 1.534605E-02 | -8.963944E-03 | 4.464050E-03 |
| 86 | -1.125547E+01 | -2.452494E-02 | 3.400595E-03 | 3.086538E-04 | -3.107643E-04 |
| Surface | $a_{12}$ | $a_{14}$ | $a_{16}$ | $a_{18}$ | $a_{20}$ |
| 15 | -1.158577E-02 | 3.557674E-03 | -3.497976E-04 | | |
| 16 | -1.795750E-02 | 8.253370E-03 | -1.464510E-03 | | |
| 25 | 3.218797E-02 | -9.311582E-03 | 1.289676E-03 | | |
| 26 | -4.743859E-02 | 3.542271E-02 | -8.294398E-03 | | |
| 35 | -1.183026E-01 | 7.187017E-02 | -1.653415E-02 | | |
| 36 | -5.955767E-02 | 3.552200E-02 | -8.504870E-03 | | |
| 45 | 1.698924E-01 | -8.353946E-02 | 1.635012E-02 | | |
| 46 | 1.033378E-01 | -4.637954E-02 | 8.616739E-03 | | |
| 55 | 4.712617E-02 | -1.892306E-02 | 3.221425E-03 | | |
| 56 | 3.591894E-02 | -1.165898E-02 | 1.604497E-03 | | |
| 65 | 1.619784E-02 | -5.268404E-03 | 9.501542E-04 | -7.357809E-05 | -4.848052E-07 |
| 66 | 6.807558E-03 | -1.916159E-03 | 3.331743E-04 | -3.316151E-05 | 1.455432E-06 |
| 75 | -7.914503E-03 | 2.493073E-03 | -4.575614E-04 | 4.543537E-05 | -1.885296E-06 |
| 76 | -4.261165E-03 | 9.859485E-04 | -1.387048E-04 | 1.077862E-05 | -3.541366E-07 |
| 85 | -1.450169E-03 | 3.090684E-04 | -4.056651E-05 | 2.916782E-06 | -8.717548E-08 |
| 86 | 7.265553E-05 | -8.791556E-06 | 5.990445E-07 | -2.182082E-08 | 3.312210E-10 |

FIG. 25

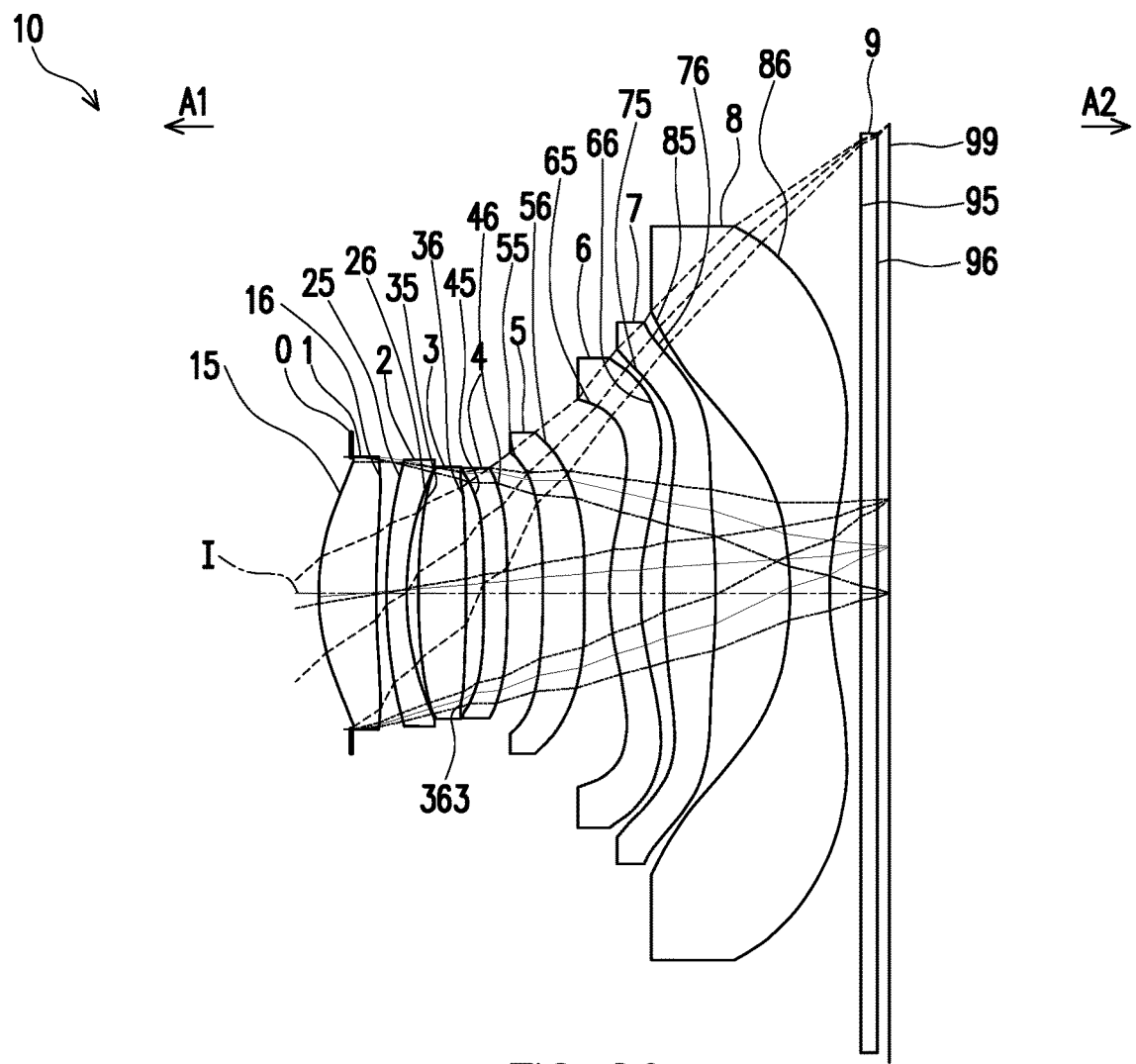
FIG. 26
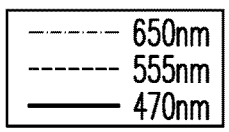
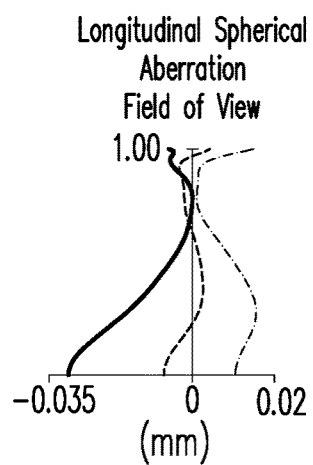
FIG. 27A
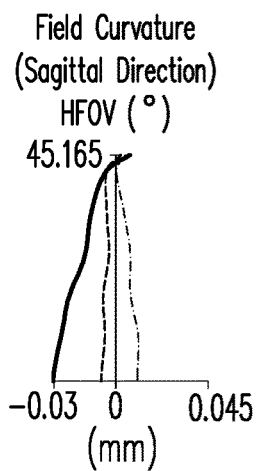
FIG. 27B
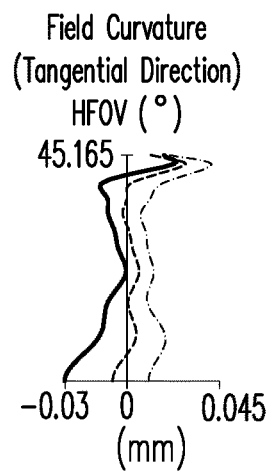
FIG. 27C
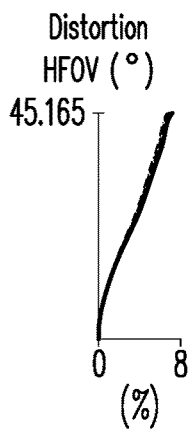
FIG. 27D

| Sixth Embodiment ||||||
|---|---|---|---|---|---|
| EFL = 4.174 mm, HFOV = 45.165°, TTL = 5.458 mm, Fno = 1.600, ImgH = 4.500 mm ||||||
| Device | Surface | Radius (mm) | Thickness (mm) | Refractive Index | Abbe Number | Focal Length (mm) |
| Object | | infinity | infinity | | | |
| Aperture 0 | | infinity | -0.311 | | | |
| First Lens Element 1 | Object-side Surface 15 | 2.209 | 0.547 | 1.544 | 55.951 | 5.718 |
| | Image-side Surface 16 | 6.907 | 0.096 | | | |
| Second Lens Element 2 | Object-side Surface 25 | 3.863 | 0.194 | 1.671 | 19.243 | -13.931 |
| | Image-side Surface 26 | 2.686 | 0.114 | | | |
| Third Lens Element 3 | Object-side Surface 35 | 6.681 | 0.452 | 1.544 | 55.951 | 9.699 |
| | Image-side Surface 36 | -24.864 | 0.175 | | | |
| Fourth Lens Element 4 | Object-side Surface 45 | -22.521 | 0.224 | 1.671 | 19.243 | -173.561 |
| | Image-side Surface 46 | -27.967 | 0.340 | | | |
| Fifth Lens Element 5 | Object-side Surface 55 | -9.648 | 0.399 | 1.544 | 55.951 | -54.041 |
| | Image-side Surface 56 | -14.549 | 0.242 | | | |
| Sixth Lens Element 6 | Object-side Surface 65 | 2.306 | 0.298 | 1.671 | 19.243 | 48.133 |
| | Image-side Surface 66 | 2.352 | 0.221 | | | |
| Seventh Lens Element 7 | Object-side Surface 75 | 5.722 | 0.497 | 1.544 | 55.951 | 5.234 |
| | Image-side Surface 76 | -5.529 | 0.711 | | | |
| Eighth Lens Element 8 | Object-side Surface 85 | -3.851 | 0.381 | 1.535 | 55.712 | -3.053 |
| | Image-side Surface 86 | 2.952 | 0.300 | | | |
| Filter 9 | Object-side Surface 95 | infinity | 0.150 | 1.563 | 51.300 | |
| | Image-side Surface 96 | infinity | 0.118 | | | |
| | Image Plane 99 | infinity | | | | |

FIG. 28

| Surface | K | $a_4$ | $a_6$ | $a_8$ | $a_{10}$ |
|---|---|---|---|---|---|
| 15 | 9.159929E-02 | -9.917183E-03 | 4.517744E-03 | -2.637780E-02 | 2.892566E-02 |
| 16 | 1.956794E+01 | -5.098957E-02 | 1.606065E-02 | -9.586609E-03 | 3.958713E-03 |
| 25 | -2.406617E+01 | -2.031911E-02 | -1.540186E-02 | 8.005807E-02 | -9.234901E-02 |
| 26 | -1.670340E+00 | -2.151718E-02 | -6.579353E-03 | 5.160385E-02 | -5.005707E-02 |
| 35 | 2.457133E+01 | 1.118637E-02 | -6.459944E-03 | -4.305467E-02 | 1.073914E-01 |
| 36 | -1.477997E+01 | -1.184458E-02 | -4.296528E-03 | -1.623631E-02 | 3.978030E-02 |
| 45 | -3.206032E+01 | -6.309536E-02 | -5.772485E-02 | 1.176207E-01 | -2.097031E-01 |
| 46 | 6.892949E+01 | -4.546731E-02 | -5.125794E-02 | 9.774557E-02 | -1.468630E-01 |
| 55 | 4.392846E+01 | -1.497403E-02 | -3.612032E-02 | 5.811694E-02 | -7.170317E-02 |
| 56 | 8.225113E+01 | -7.349786E-02 | -2.121937E-03 | 3.027730E-02 | -3.632646E-02 |
| 65 | -3.104754E+00 | -6.706971E-02 | 2.480512E-02 | -3.393644E-02 | 3.250791E-02 |
| 66 | -3.041840E+00 | -4.755650E-02 | 6.319829E-03 | -1.142726E-02 | 1.148372E-02 |
| 75 | -9.002855E+00 | 1.894284E-03 | -5.759749E-03 | -3.644876E-03 | 2.976698E-03 |
| 76 | -2.690996E+01 | 4.370844E-02 | -1.283852E-02 | -1.466767E-03 | 1.232120E-03 |
| 85 | 6.900848E-01 | -4.064516E-02 | 2.375570E-03 | 1.153281E-03 | -1.468605E-05 |
| 86 | -1.045023E+01 | -2.948479E-02 | 4.735637E-03 | -6.543009E-05 | -2.337247E-04 |
| Surface | $a_{12}$ | $a_{14}$ | $a_{16}$ | $a_{18}$ | $a_{20}$ |
| 15 | -2.080480E-02 | 6.834671E-03 | -8.126590E-04 | | |
| 16 | -6.167362E-03 | 3.932164E-03 | -8.285219E-04 | | |
| 25 | 6.109521E-02 | -2.254615E-02 | 3.721084E-03 | | |
| 26 | 1.014248E-02 | 9.036967E-03 | -3.004588E-03 | | |
| 35 | -1.362848E-01 | 8.680091E-02 | -2.007713E-02 | | |
| 36 | -4.921537E-02 | 3.488957E-02 | -8.888543E-03 | | |
| 45 | 2.032667E-01 | -9.882673E-02 | 1.916392E-02 | | |
| 46 | 1.262192E-01 | -5.676811E-02 | 1.044627E-02 | | |
| 55 | 4.812784E-02 | -1.826368E-02 | 2.911737E-03 | | |
| 56 | 2.194198E-02 | -7.309557E-03 | 1.043576E-03 | | |
| 65 | -1.965066E-02 | 7.607913E-03 | -1.916944E-03 | 2.914224E-04 | -2.092937E-05 |
| 66 | -5.903554E-03 | 1.747049E-03 | -3.061384E-04 | 2.954470E-05 | -1.206041E-06 |
| 75 | -1.485535E-03 | 4.594489E-04 | -8.275907E-05 | 8.125941E-06 | -3.364660E-07 |
| 76 | -4.173034E-04 | 9.760926E-05 | -1.399193E-05 | 1.099044E-06 | -3.628879E-08 |
| 85 | -1.998762E-05 | 3.232498E-07 | 1.849048E-07 | -1.277200E-08 | 5.128850E-10 |
| 86 | 5.878079E-05 | -6.831018E-06 | 4.189854E-07 | -1.270255E-08 | 1.380540E-10 |

FIG. 29

| Conditional Expression | First Embodiment | Second Embodiment | Third Embodiment | Fourth Embodiment | Fifth Embodiment | Sixth Embodiment |
|---|---|---|---|---|---|---|
| T1 | 0.533 | 0.770 | 0.445 | 0.432 | 0.544 | 0.547 |
| G12 | 0.079 | 0.102 | 0.119 | 0.038 | 0.102 | 0.096 |
| T2 | 0.183 | 0.280 | 0.280 | 0.160 | 0.193 | 0.194 |
| G23 | 0.180 | 0.074 | 0.093 | 0.107 | 0.122 | 0.114 |
| T3 | 0.516 | 0.239 | 0.581 | 0.336 | 0.462 | 0.452 |
| G34 | 0.128 | 0.207 | 0.383 | 0.207 | 0.166 | 0.175 |
| T4 | 0.201 | 0.166 | 0.293 | 0.186 | 0.244 | 0.224 |
| G45 | 0.406 | 0.238 | 0.397 | 0.332 | 0.261 | 0.340 |
| T5 | 0.370 | 0.211 | 0.362 | 0.393 | 0.392 | 0.399 |
| G56 | 0.268 | 0.366 | 0.193 | 0.044 | 0.275 | 0.242 |
| T6 | 0.382 | 0.679 | 0.309 | 0.268 | 0.356 | 0.298 |
| G67 | 0.193 | 0.080 | 0.089 | 0.147 | 0.194 | 0.221 |
| T7 | 0.367 | 0.591 | 0.734 | 0.479 | 0.495 | 0.497 |
| G78 | 0.725 | 0.852 | 0.688 | 0.943 | 0.736 | 0.711 |
| T8 | 0.200 | 0.214 | 0.307 | 0.844 | 0.439 | 0.381 |
| G8F | 0.300 | 0.300 | 0.300 | 0.300 | 0.300 | 0.300 |
| TF | 0.150 | 0.150 | 0.150 | 0.150 | 0.150 | 0.150 |
| GFP | 0.219 | 0.010 | 0.030 | 0.143 | 0.127 | 0.118 |
| BFL | 0.669 | 0.460 | 0.480 | 0.593 | 0.577 | 0.568 |
| EFL | 4.039 | 4.185 | 4.307 | 4.109 | 4.238 | 4.174 |
| TTL | 5.399 | 5.530 | 5.752 | 5.509 | 5.560 | 5.458 |
| TL | 4.731 | 5.070 | 5.272 | 4.916 | 4.982 | 4.890 |
| ALT | 2.752 | 3.151 | 3.312 | 3.098 | 3.126 | 2.991 |
| AAG | 1.979 | 1.920 | 1.960 | 1.818 | 1.857 | 1.899 |
| L48 | 2.910 | 3.231 | 3.079 | 3.449 | 3.149 | 3.088 |
| L14 | 1.821 | 1.839 | 2.194 | 1.466 | 1.834 | 1.802 |

FIG. 30

| Conditional Expression | First Embodiment | Second Embodiment | Third Embodiment | Fourth Embodiment | Fifth Embodiment | Sixth Embodiment |
|---|---|---|---|---|---|---|
| (ALT+BFL)/(G45+T5+G56) | 3.278 | 4.429 | 3.984 | 4.800 | 3.991 | 3.629 |
| (G78+T8)/T5 | 2.501 | 5.043 | 2.746 | 4.550 | 3.000 | 2.740 |
| TL/(T1+T7+T8) | 4.299 | 3.219 | 3.547 | 2.801 | 3.370 | 3.431 |
| AAG/(T2+T3) | 2.831 | 3.700 | 2.277 | 3.664 | 2.830 | 2.940 |
| EFL/(T6+G67+T7) | 4.290 | 3.100 | 3.805 | 4.600 | 4.053 | 4.108 |
| (T1+T3+T5)/G45 | 3.499 | 5.134 | 3.500 | 3.500 | 5.350 | 4.105 |
| (T7+G78)/(T6+G67) | 1.901 | 1.900 | 3.571 | 3.430 | 2.237 | 2.327 |
| V2+V3+V4 | 109.759 | 94.437 | 94.437 | 94.437 | 94.437 | 94.437 |
| ALT/(G12+G23+G34+G56) | 4.201 | 4.200 | 4.207 | 7.805 | 4.699 | 4.772 |
| (T7+G78+T8)/T4 | 6.421 | 9.997 | 5.898 | 12.197 | 6.855 | 7.107 |
| (T3+G45)/T1 | 1.729 | 0.619 | 2.195 | 1.547 | 1.332 | 1.449 |
| (T1+T2)/(G34+G45) | 1.341 | 2.359 | 0.931 | 1.098 | 1.724 | 1.436 |
| V4+V5+V6 | 102.098 | 94.437 | 57.729 | 94.437 | 94.437 | 94.437 |
| (G56+G78)/T4 | 4.935 | 7.350 | 3.004 | 5.315 | 4.147 | 4.260 |
| (G23+T3)/T1 | 1.306 | 0.407 | 1.512 | 1.027 | 1.075 | 1.035 |
| TTL/(G78+T8+BFL) | 3.388 | 3.624 | 3.901 | 2.314 | 3.172 | 3.288 |
| (G45+G56+G78)/T3 | 2.708 | 6.087 | 2.200 | 3.923 | 2.750 | 2.859 |
| (T4+G45+T5)/T6 | 2.560 | 0.905 | 3.401 | 3.400 | 2.519 | 3.234 |
| L48/L14 | 1.598 | 1.757 | 1.404 | 2.352 | 1.717 | 1.714 |

FIG. 31

OPTICAL IMAGING LENS INCLUDING EIGHT LENSES OF +−++−−+−, +−+−−−+−, +−+−+−+− OR +−+−−++− REFRACTIVE POWERS

CROSS-REFERENCE TO RELATED APPLICATION

This application claims the priority benefit of China application serial no. 201911326320.5, filed on Dec. 20, 2019. The entirety of the above-mentioned patent application is hereby incorporated by reference herein and made a part of this specification.

BACKGROUND

Technical Field

The disclosure relates to an optical device, and more particularly, to an optical imaging lens.

Description of Related Art

In recent years, the optical imaging lenses have evolved to be widely applied. The number of optical lenses of the optical imaging lenses is increased to correct aberration and dispersion problems, such that the imaging quality can reach a higher level. However, along with the increase in the number of optical lenses, the distance from the object-side surface of the first lens element to the image plane along the optical axis is correspondingly increased, which makes it difficult to achieve the slimness requirement required by mobile phones, digital cameras, and lenses for vehicles. Hence, how to design an optical imaging lens characterized by good imaging quality, compactness, and slimness has always been the development goal. In addition, the requirement for small f-number (Fno) also contributes to an enhancement of luminous flux, and the requirement for expanded field of view has gradually gained increasing market attention. Therefore, how to design an optical imaging lens characterized by small Fno and large field of view in addition to compactness and slimness has been the research and development focus as well.

SUMMARY

The disclosure provides an optical imaging lens with good imaging quality as well as small f-number (Fno), short system length, and large field of view.

In an embodiment of the disclosure, an optical imaging lens including a first lens element, a second lens element, a third lens element, a fourth lens element, a fifth lens element, a sixth lens element, a seventh lens element, and an eighth lens element sequentially arranged from an object side to an image side along an optical axis is provided. Each of the first lens element to the eighth lens element includes an object-side surface facing the object side and allowing imaging rays to pass through and an image-side surface facing the image side and allowing the imaging rays to pass through. The first lens element has positive refracting power. The second lens element has negative refracting power. An optical axis region of the object-side surface of the fifth lens element is concave. An optical axis region of the object-side surface of the sixth lens element is convex. An optical axis region of the image-side surface of the seventh lens element is convex. Lens elements having refracting power in the optical imaging lens are only the first lens element to the eighth lens element described above, and the optical imaging lens satisfies the following conditional expression: $(ALT+BFL)/(G45+T5+G56) \leq 4.800$. Here, ALT is a sum of the thicknesses of eight lens elements from the first lens element to the eighth lens element along the optical axis, BFL is a distance from the image-side surface of the eighth lens element to an image plane along the optical axis, G45 is an air gap from the fourth lens element to the fifth lens element along the optical axis, G56 is an air gap from the fifth lens element to the sixth lens element along the optical axis, and T5 is a thickness of the fifth lens element along the optical axis.

In an embodiment of the disclosure, an optical imaging lens including a first lens element, a second lens element, a third lens element, a fourth lens element, a fifth lens element, a sixth lens element, a seventh lens element, and an eighth lens element sequentially arranged from an object side to an image side along an optical axis is provided. Each of the first lens element to the eighth lens element includes an object-side surface facing the object side and allowing imaging rays to pass through and an image-side surface facing the image side and allowing the imaging rays to pass through. The first lens element has positive refracting power. The second lens element has negative refracting power. An optical axis region of the object-side surface of the fifth lens element is concave. An optical axis region of the image-side surface of the sixth lens element is concave. An optical axis region of the image-side surface of the seventh lens element is convex. Lens elements having refracting power in the optical imaging lens are only the first lens element to the eighth lens element described above, and the optical imaging lens satisfies the following conditional expression: $(ALT+BFL)/(G45+T5+G56) \leq 4.800$. Here, ALT is a sum of the thicknesses of eight lens elements from the first lens element to the eighth lens element along the optical axis, BFL is a distance from the image-side surface of the eighth lens element to an image plane along the optical axis, G45 is an air gap from the fourth lens element to the fifth lens element along the optical axis, G56 is an air gap from the fifth lens element to the sixth lens element along the optical axis, and T5 is a thickness of the fifth lens element along the optical axis.

In an embodiment of the disclosure, an optical imaging lens including a first lens element, a second lens element, a third lens element, a fourth lens element, a fifth lens element, a sixth lens element, a seventh lens element, and an eighth lens element sequentially arranged from an object side to an image side along an optical axis is provided. Each of the first lens element to the eighth lens element includes an object-side surface facing the object side and allowing imaging rays to pass through and an image-side surface facing the image side and allowing the imaging rays to pass through. The first lens element has positive refracting power. The second lens element has negative refracting power, and a periphery region of the object-side surface of the second lens element is convex. An optical axis region of an object-side surface of the fourth lens element is concave. An optical axis region of an object-side surface of the fifth lens element is concave. An optical axis region of the image-side surface of the sixth lens element is concave. An optical axis region of an object-side surface of the seventh lens element is convex. Lens elements having refracting power in the optical imaging lens are only the first lens element to the eighth lens element described above, and the optical imaging lens satisfies the following conditional expression: $(ALT+BFL)/(G45+T5+G56) \leq 4.800$. Here, ALT is a sum of the thicknesses of eight lens elements from the first lens element to the eighth lens element along the optical axis, BFL is a distance from the image-side surface of the eighth lens element to an image plane along the optical axis, G45 is an air gap from the fourth lens element to the fifth lens element along the optical axis, G56 is an air gap from the fifth lens element to the sixth lens element along the optical axis, and T5 is a thickness of the fifth lens element along the optical axis.

In view of the above, the optical imaging lens provided in one or more embodiments of the disclosure is advantageous because of the following: the optical imaging lens satisfies the arrangement of concave/convex surfaces and combination of refracting power of the lens elements and said conditional expressions, so that the optical imaging lens provided herein can have good imaging quality as well as small Fno, short system length, and large field of view.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 8 shows detailed optical data of the optical imaging lens according to the first embodiment of the disclosure.

FIG. 9 shows aspheric surface parameters pertaining to the optical imaging lens according to the first embodiment of the disclosure.

FIG. 10 is a schematic diagram illustrating an optical imaging lens according to a second embodiment of the disclosure.

FIG. 11A to FIG. 11D are diagrams illustrating a longitudinal spherical aberration and various aberrations of the optical imaging lens according to the second embodiment.

FIG. 12 shows detailed optical data of the optical imaging lens according to the second embodiment of the disclosure.

FIG. 13 shows aspheric surface parameters pertaining to the optical imaging lens according to the second embodiment of the disclosure.

FIG. 14 is a schematic diagram illustrating an optical imaging lens according to a third embodiment of the disclosure.

FIG. 15A to FIG. 15D are diagrams illustrating a longitudinal spherical aberration and various aberrations of the optical imaging lens according to the third embodiment.

FIG. 16 shows detailed optical data of the optical imaging lens according to the third embodiment of the disclosure.

FIG. 17 shows aspheric surface parameters pertaining to the optical imaging lens according to the third embodiment of the disclosure.

FIG. 20 shows detailed optical data of the optical imaging lens according to the fourth embodiment of the disclosure.

FIG. 21 shows aspheric surface parameters pertaining to the optical imaging lens according to the fourth embodiment of the disclosure.

FIG. 24 shows detailed optical data of the optical imaging lens according to the fifth embodiment of the disclosure.

FIG. 25 shows aspheric surface parameters pertaining to the optical imaging lens according to the fifth embodiment of the disclosure.

FIG. 26 is a schematic diagram illustrating an optical imaging lens according to a sixth embodiment of the disclosure.

FIG. 27A to FIG. 27D are diagrams illustrating a longitudinal spherical aberration and various aberrations of the optical imaging lens according to the sixth embodiment.

FIG. 28 shows detailed optical data of the optical imaging lens according to the sixth embodiment of the disclosure.

FIG. 29 shows aspheric surface parameters pertaining to the optical imaging lens according to the sixth embodiment of the disclosure.

FIG. 30 and FIG. 31 show values of respective important parameters and relations of the optical imaging lens according to the first to sixth embodiments of the disclosure.

DESCRIPTION OF THE EMBODIMENTS

The terms "optical axis region", "periphery region", "concave", and "convex" used in this specification and claims should be interpreted based on the definition listed in the specification by the principle of lexicographer.

Figure 1:
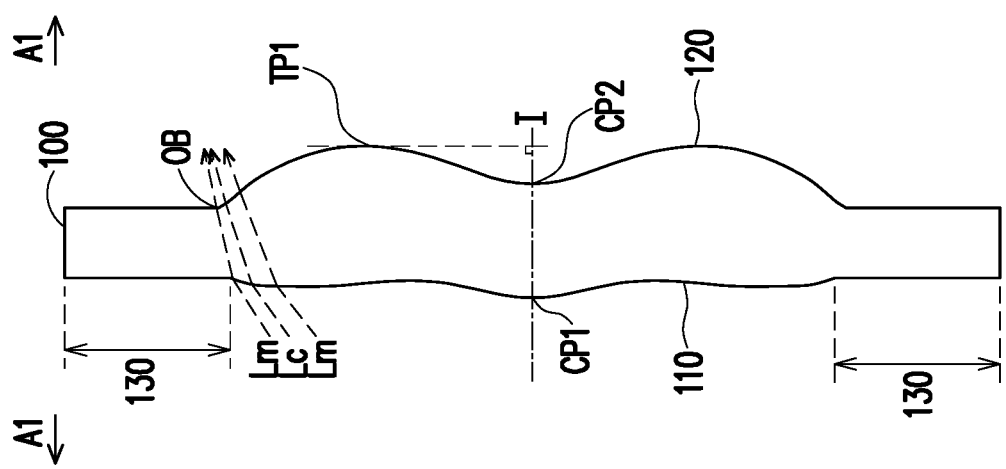
FIG. 1 is a schematic diagram illustrating a surface shape structure of a lens element.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
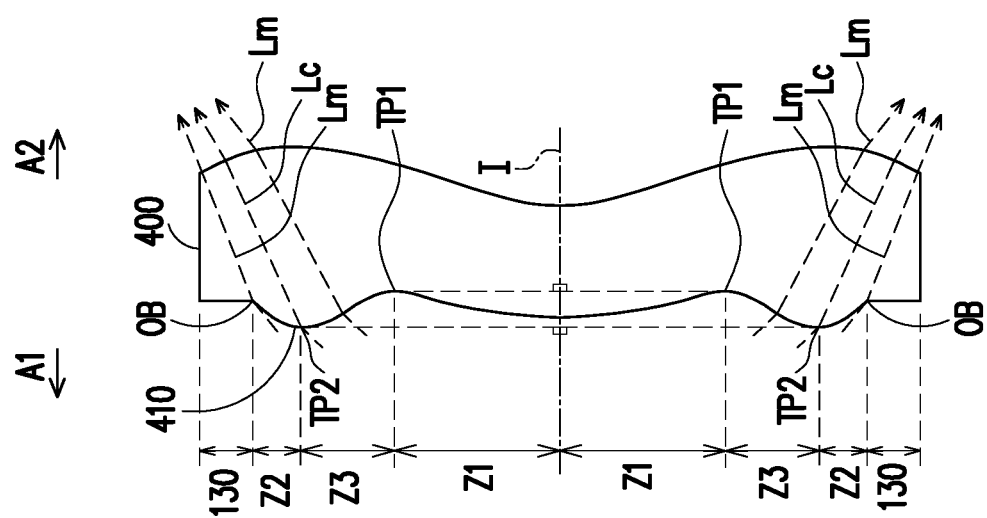
FIG. 4 is a schematic diagram illustrating a surface shape structure of a lens element according to Example 2.

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

The region of a surface of the lens element from the central point to the first transition point TP1 is defined as the optical axis region, which includes the central point. The region located radially outside of the farthest Nth transition point from the optical axis I to the optical boundary OB of the surface of the lens element is defined as the periphery region. In some embodiments, there may be intermediate regions present between the optical axis region and the periphery region, with the number of intermediate regions depending on the number of the transition points.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 2:
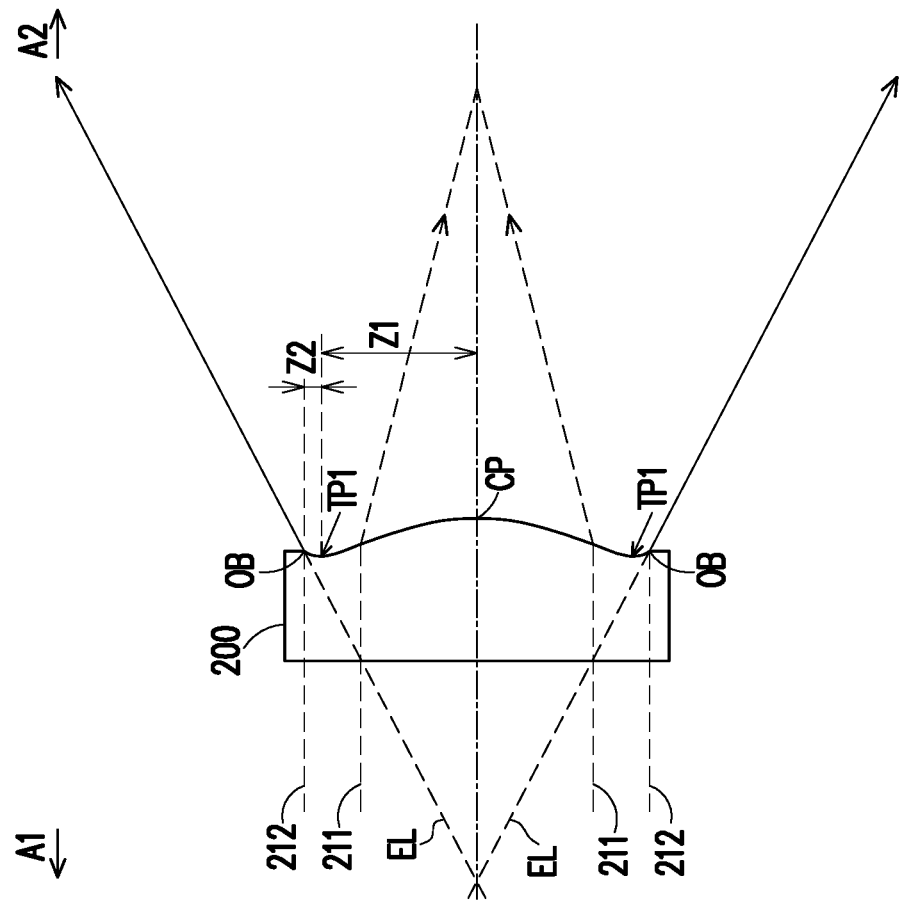
FIG. 2 is a schematic diagram illustrating concave and convex surface shape structures and a light focal point of a lens element.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex- (concave-) region," can be used alternatively.

Figure 3:
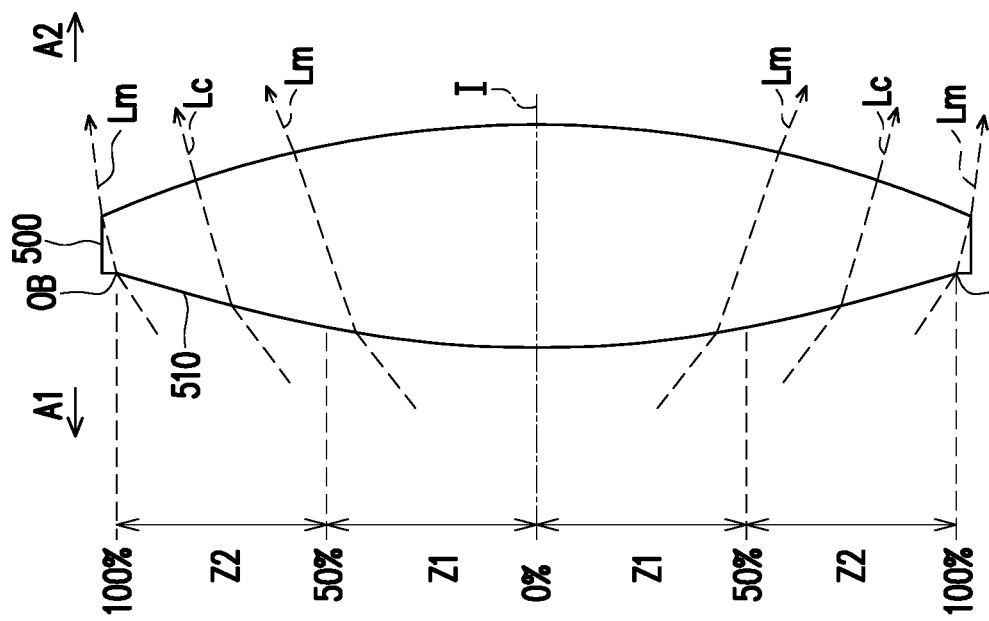
FIG. 3 is a schematic diagram illustrating a surface shape structure of a lens element according to Example 1.
Figure 5:
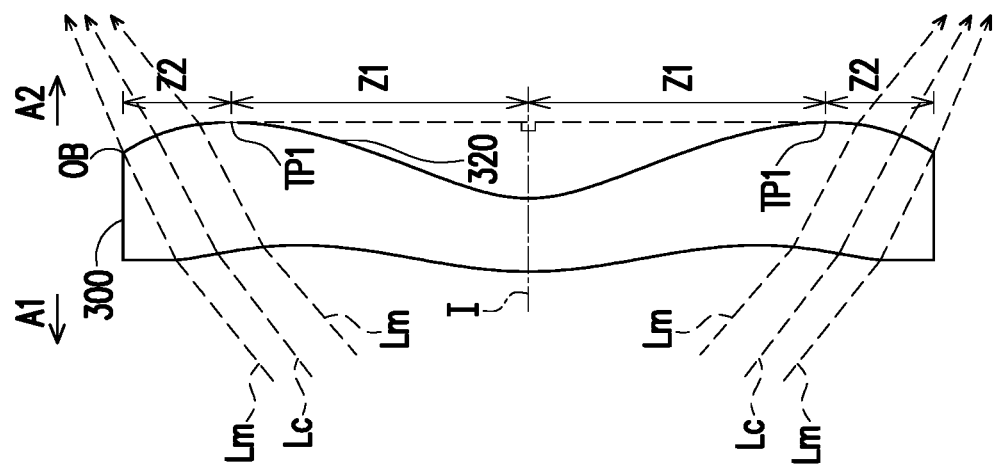
FIG. 5 is a schematic diagram illustrating a surface shape structure of a lens element according to Example 3.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region between 0-50% of the distance between the optical axis I and the optical boundary OB of the surface of the lens element and the periphery region is defined as the region between 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

Figure 6:
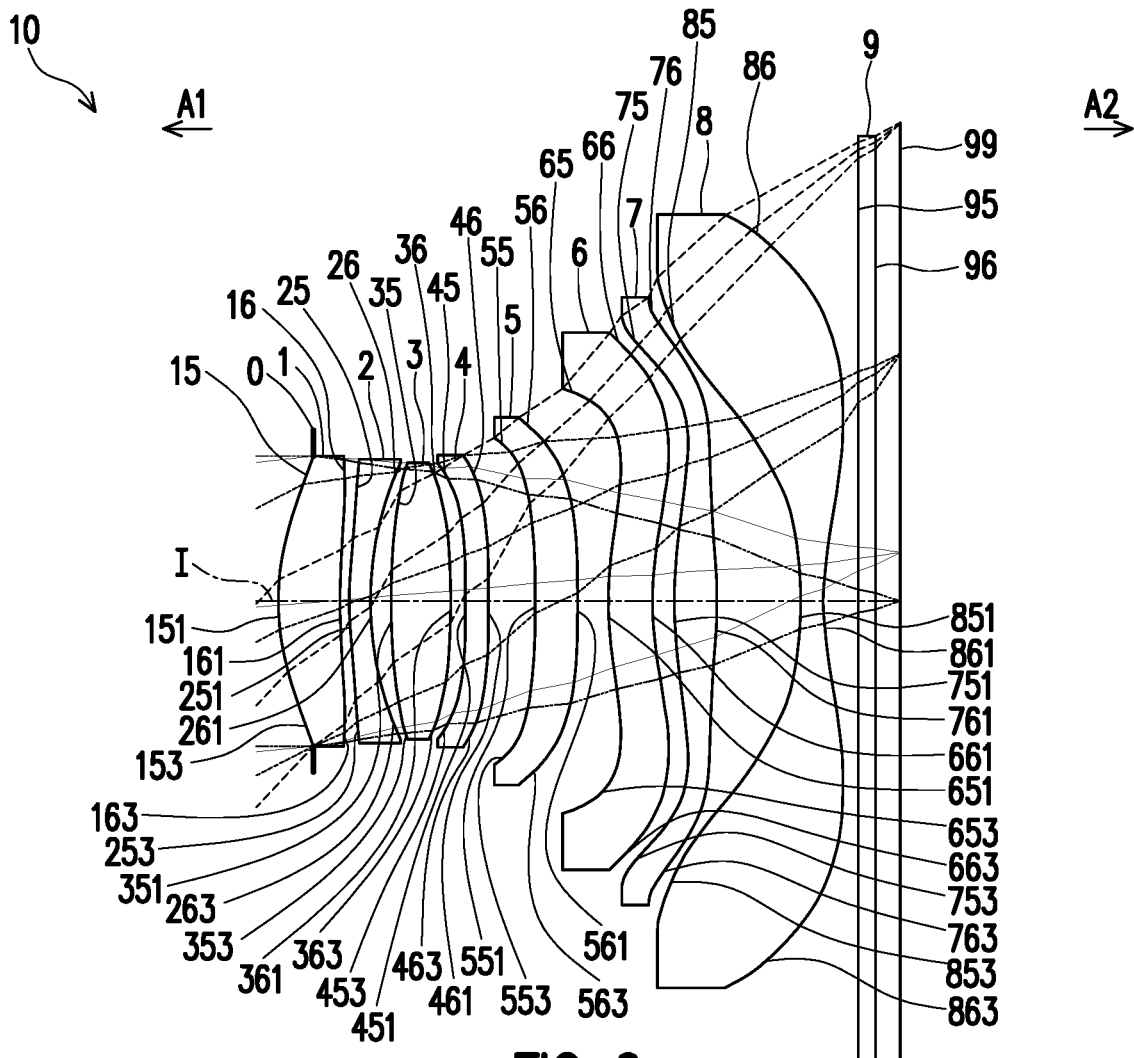
FIG. 6 is a schematic diagram illustrating an optical imaging lens according to a first embodiment of the disclosure.

FIG. 6 is a schematic diagram illustrating an optical imaging lens according to a first embodiment of the disclosure, and FIGS. 7A to 7D are diagrams illustrating a longitudinal spherical aberration and various aberrations of the optical imaging lens according to the first embodiment of the disclosure. With reference to FIG. 6 first, an optical imaging lens 10 in the first embodiment of the disclosure includes an aperture 0, a first lens element 1, a second lens element 2, a third lens element 3, a fourth lens element 4, a fifth lens element 5, a sixth lens element 6, a seventh lens element 7, an eighth lens element 8, and a filter 9 arranged in sequence from an object side A1 to an image side A2 along an optical axis I of the optical imaging lens 10. When rays emitted from an object to be shot enter the optical imaging lens 10, an image may be formed on an image plane 99 after the rays sequentially pass through the aperture 0, the first lens element 1, the second lens element 2, the third lens element 3, the fourth lens element 4, the fifth lens element 5, the sixth lens element 6, the seventh lens element 7, the eighth lens element 8, and the filter 9. The filter 9 is disposed between an image-side surface 86 of the eighth lens element 8 and the image plane 99. It is noted that the object side is a side facing the object to be shot, whereas the image side is a side facing the image plane 99. In an embodiment, the filter 9 may be an infrared cut filter (IR cut filter), which should however not be construed as limitation in the disclosure.

In the present embodiment, the first lens element 1, the second lens element 2, the third lens element 3, the fourth lens element 4, the fifth lens element 5, the sixth lens element 6, the seventh lens element 7, the eighth lens element 8, and the filter 9 of the optical imaging lens 10 respectively have object-side surfaces 15, 25, 35, 45, 55, 65, 75, 85, and 95 facing the object side and allowing imaging rays to pass through and image-side surfaces 16, 26, 36, 46, 56, 66, 76, 86, and 96 facing the image side and allowing the imaging rays to pass through. In the present embodiment, the first lens element 1 is disposed between the aperture 0 and the second lens element 2.

The first lens element 1 has positive refracting power. The first lens element 1 is made of plastic. An optical axis region 151 of the object-side surface 15 of the first lens element 1 is convex, and a periphery region 153 thereof is convex. An optical axis region 161 of the image-side surface 16 of the first lens element 1 is concave, and a periphery region 163 thereof is convex. In the present embodiment, both the object-side surface 15 and the image-side surface 16 of the first lens element 1 are aspheric surfaces, which should however not be construed as limitation in the disclosure.

The second lens element 2 has negative refracting power. The second lens element 2 is made of plastic. An optical axis region 251 of the object-side surface 25 of the second lens element 2 is convex, and a periphery region 253 thereof is convex. An optical axis region 261 of the image-side surface 26 of the second lens element 2 is concave, and a periphery region 263 thereof is concave. In the present embodiment, both the object-side surface 25 and the image-side surface 26 of the second lens element 2 are aspheric surfaces, which should however not be construed as limitation in the disclosure.

The third lens element 3 has positive refracting power. The third lens element 3 is made of plastic. An optical axis region 351 of the object-side surface 35 of the third lens element 3 is convex, and a periphery region 353 thereof is convex. An optical axis region 361 of the image-side surface 36 of the third lens element 3 is convex, and a periphery region 363 thereof is convex. In the present embodiment, both the object-side surface 35 and the image-side surface 36 of the third lens element 3 are aspheric surfaces, which should however not be construed as limitation in the disclosure.

The fourth lens element 4 has positive refracting power. The fourth lens element 4 is made of plastic. An optical axis region 451 of the object-side surface 45 of the fourth lens element 4 is concave, and a periphery region 453 thereof is concave. An optical axis region 461 of the image-side surface 46 of the fourth lens element 4 is convex, and a periphery region 463 thereof is convex. In the present embodiment, both the object-side surface 45 and the image-side surface 46 of the fourth lens element 4 are aspheric surfaces, which should however not be construed as limitation in the disclosure.

The fifth lens element 5 has negative refracting power. The fifth lens element 5 is made of plastic. An optical axis region 551 of the object-side surface 55 of the fifth lens element 5 is concave, and a periphery region 553 thereof is concave. An optical axis region 561 of the image-side surface 56 of the fifth lens element 5 is convex, and a periphery region 563 thereof is convex. In the present embodiment, both the object-side surface 55 and the image-side surface 56 of the fifth lens element 5 are aspheric surfaces, which should however not be construed as limitation in the disclosure.

The sixth lens element 6 has negative refracting power. The sixth lens element 6 is made of plastic. An optical axis region 651 of the object-side surface 65 of the sixth lens element 6 is convex, and a periphery region 653 thereof is concave. An optical axis region 661 of the image-side surface 66 of the sixth lens element 6 is concave, and a periphery region 663 thereof is convex. In the present embodiment, both the object-side surface 65 and the image-side surface 66 of the sixth lens element 6 are aspheric surfaces, which should however not be construed as limitation in the disclosure.

The seventh lens element 7 has positive refracting power. The seventh lens element 7 is made of plastic. An optical axis region 751 of the object-side surface 75 of the seventh lens element 7 is convex, and a periphery region 753 thereof is concave. An optical axis region 761 of the image-side surface 76 of the seventh lens element 7 is convex, and a periphery region 763 thereof is convex. In the present embodiment, both the object-side surface 75 and the image-side surface 76 of the seventh lens element 7 are aspheric surfaces, which should however not be construed as limitation in the disclosure.

The eighth lens element 8 has negative refracting power. The eighth lens element 8 is made of plastic. An optical axis region 851 of the object-side surface 85 of the eighth lens element 8 is concave, and a periphery region 853 thereof is concave. An optical axis region 861 of the image-side surface 86 of the eighth lens element 8 is concave, and a periphery region 863 thereof is convex. In the present embodiment, both the object-side surface 85 and the image-side surface 86 of the eighth lens element 8 are aspheric surfaces, which should however not be construed as limitation in the disclosure.

In the present embodiment, lens elements having refracting power in the optical imaging lens 10 are only said eight lens elements.

Other detailed optical data provided in the first embodiment are shown in FIG. 8. In addition, the effective focal length (EFL) of the optical imaging lens 10 provided in the first embodiment is 4.039 millimeters (mm), the half field of view (HFOV) thereof is 46.892°, the f-number (Fno) thereof is 1.600, the system length thereof is 5.399 mm, and the image height thereof is 4.163. Herein, the system length is the distance from the object-side surface 15 of the first lens element 1 to the image plane 99 along the optical axis I.

Besides, in the present embodiment, a total of sixteen surfaces including the object-side surfaces 15, 25, 35, 45, 55, 65, 75, and 85 and image-side surfaces 16, 26, 36, 46, 56, 66, 76, and 86 of the first lens element 1, the second lens element 2, the third lens element 3, the fourth lens element 4, the fifth lens element 5, the sixth lens element 6, the seventh lens element 7, and the eighth lens element 8 are all aspheric surfaces. Herein, the object-side surfaces 15, 25, 35, 45, 55, 65, 75, and 85 and image-side surfaces 16, 26, 36, 46, 56, 66, 76, and 86 are general even aspheric surfaces. These aspheric surfaces are defined by the following formula:

$$Z(Y) = \frac{Y^2}{R} \bigg/ \left(1 + \sqrt{1-(1+K)\frac{Y^2}{R^2}}\right) + \sum_{i=1}^{n} a_{2i} \times Y^{2i} \quad (1)$$

where:
R: a radius of curvature of the surface of the lens element near the optical axis I;
Z: a depth of the aspheric surface (i.e., a vertical distance between a point on the aspheric surface that is spaced by the distance Y from the optical axis I and a tangent plane tangent to a vertex of the aspheric surface along the optical axis I);
Y: a distance from a point on an aspheric curve to the optical axis I;
K: a conic constant;
$a_{2i}$: the $2i^{th}$ order aspheric surface.

Respective aspheric surface coefficients of the object-side surface 15 of the first lens element 1 to the image-side surface 86 of the eighth lens element 8 in the formula (1) are as shown in FIG. 9. Here, the row number 15 in FIG. 9 represents aspheric surface coefficients of the object-side surface 15 of the first lens element 1, and other rows are arranged based on the same principle. The $2i^{th}$ order aspheric surface coefficients $a_2$ in the present embodiment and the following embodiments are all 0.

Besides, relations of important parameters in the optical imaging lens 10 according to the first embodiment are as shown in FIG. 30 and FIG. 31.

Here,
EFL is a system focal length of the optical imaging lens 10, i.e., an effective focal length (EFL) of the optical imaging lens 10.
HFOV is the half field of view (HFOV) of the optical imaging lens 10;
Fno is the f-number (Fno) of the optical imaging lens 10;
ImgH is an image height of the optical imaging lens 10;
T1 is a thickness of the first lens element 1 along the optical axis I;
T2 is a thickness of the second lens element 2 along the optical axis I;
T3 is a thickness of the third lens element 3 along the optical axis I;
T4 is a thickness of the fourth lens element 4 along the optical axis I;
T5 is a thickness of the fifth lens element 5 along the optical axis I;
T6 is a thickness of the sixth lens element 6 along the optical axis I;
T7 is a thickness of the seventh lens element 7 along the optical axis I;
T8 is a thickness of the eighth lens element 8 along the optical axis I;
G12 is a distance from the image-side surface 16 of the first lens element 1 to the object-side surface 25 of the second lens element 2 along the optical axis I, i.e., an air gap from the first lens element 1 to the second lens element 2 along the optical axis I;
G23 is a distance from the image-side surface 26 of the second lens element 2 to the object-side surface 35 of the third lens element 3 along the optical axis I, i.e., an air gap from the second lens element 2 to the third lens element 3 along the optical axis I;
G34 is a distance from the image-side surface 36 of the third lens element 3 to the object-side surface 45 of the fourth lens element 4 along the optical axis I, i.e., an air gap from the third lens element 3 to the fourth lens element 4 along the optical axis I;
G45 is a distance from the image-side surface 46 of the fourth lens element 4 to the object-side surface 55 of the fifth lens element 5 along the optical axis I, i.e., an air gap from the fourth lens element 4 to the fifth lens element 5 along the optical axis I;
G56 is a distance from the image-side surface 56 of the fifth lens element 5 to the object-side surface 65 of the sixth lens element 6 along the optical axis I, i.e., an air gap from the fifth lens element 5 to the sixth lens element 6 along the optical axis I;

G67 is a distance from the image-side surface 66 of the sixth lens element 6 to the object-side surface 75 of the seventh lens element 7 along the optical axis I, i.e., an air gap from the sixth lens element 6 to the seventh lens element 7 along the optical axis I;

G78 is a distance from the image-side surface 76 of the seventh lens element 7 to the object-side surface 85 of the eighth lens element 8 along the optical axis I, i.e., an air gap from the seventh lens element 7 to the eighth lens element 8 along the optical axis I;

G8F is a distance from the image-side surface 86 of the eighth lens element 8 to the object-side surface 95 of the filter 9 along the optical axis I, i.e., an air gap from the eighth lens element 8 to the filter 9 along the optical axis I;

TF is a thickness of the filter 9 along the optical axis I;

GFP is a distance from the image-side surface 96 of the filter 9 to the image plane 99 along the optical axis I, i.e., an air gap from the filter 9 to the image plane 99 along the optical axis I;

TTL is a distance from the object-side surface 15 of the first lens element 1 to the image plane 99 along the optical axis I;

BFL is a distance from the image-side surface 86 of the eighth lens element 8 to the image plane 99 along the optical axis I;

AAG is a sum of seven air gaps from the first lens element 1 to the eighth lens element 8 along the optical axis I, i.e., the sum of G12, G23, G34, G45, G56, G67, and G78;

ALT is a sum of the thicknesses of eight lens elements from the first lens element 1 to the eighth lens element 8 along the optical axis I, i.e., the sum of T1, T2, T3, T4, T5, T6, T7, and T8;

TL is a distance from the object-side surface 15 of the first lens element 1 to the image-side surface 86 of the eighth lens element 8 along the optical axis I;

L14 is a distance from the object-side surface 15 of the first lens element 1 to the image-side surface 46 of the fourth lens element 4 along the optical axis I;

L48 is a distance from the image-side surface 46 of the fourth lens element 4 to the image-side surface 86 of the eighth lens element 8 along the optical axis I; Besides, other definitions are provided below:

f1 is a focal length of the first lens element 1;
f2 is a focal length of the second lens element 2;
f3 is a focal length of the third lens element 3;
f4 is a focal length of the fourth lens element 4;
f5 is a focal length of the fifth lens element 5;
f6 is a focal length of the sixth lens element 6;
f7 is a focal length of the seventh lens element 7;
f8 is a focal length of the eighth lens element 8;
n1 is a refractive index of the first lens element 1;
n2 is a refractive index of the second lens element 2;
n3 is a refractive index of the third lens element 3;
n4 is a refractive index of the fourth lens element 4;
n5 is a refractive index of the fifth lens element 5;
n6 is a refractive index of the sixth lens element 6;
n7 is a refractive index of the seventh lens element 7;
n8 is a refractive index of the eighth lens element 8;
V1 is an Abbe number of the first lens element 1, and the Abbe number may also be referred to as a dispersion coefficient;
V2 is an Abbe number of the second lens element 2;
V3 is an Abbe number of the third lens element 3;
V4 is an Abbe number of the fourth lens element 4;
V5 is an Abbe number of the fifth lens element 5;
V6 is an Abbe number of the sixth lens element 6;
V7 is an Abbe number of the seventh lens element 7; and
V8 is an Abbe number of the eighth lens element 8.

Figures 7A, 7B, 7C, 7D:
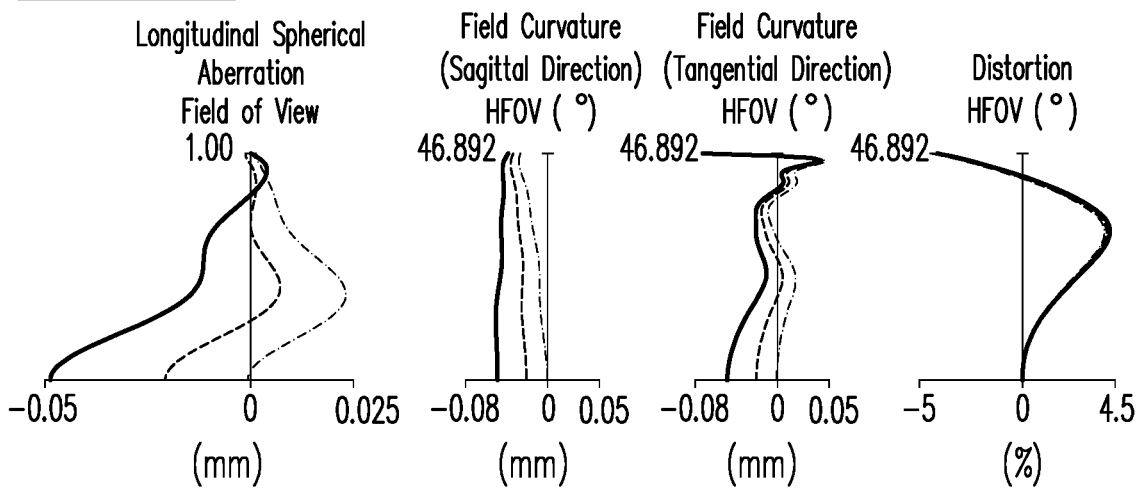
FIG. 7A to FIG. 7D are diagrams illustrating a longitudinal spherical aberration and various aberrations of the optical imaging lens according to the first embodiment.

With reference to FIG. 7A to FIG. 7D, FIG. 7A illustrates the longitudinal spherical aberration provided in the first embodiment, FIG. 7B and FIG. 7C respectively illustrate the field curvature aberration in the sagittal direction and the field curvature aberration in the tangential direction on the image plane 99 of the first embodiment when the wavelength is 470 nm, 555 nm, and 650 nm, and FIG. 7D illustrates the distortion aberration on the image plane 99 of the first embodiment when the wavelength is 470 nm, 555 nm, and 650 nm. In FIG. 7A illustrating the longitudinal spherical aberration of the first embodiment, the curves representing the respective wavelengths are close to each other and approach the center, indicating that off-axis rays in different heights at the respective wavelengths are focused in a vicinity of the imaging point. Based on extents of deviation of the curves for the respective wavelengths, imaging point deviations of the off-axis rays in different heights are controlled within a range of ±0.05 mm. Therefore, the spherical aberration of the same wavelength is reduced in the first embodiment, and the distances among the three representative wavelengths are also close, indicating that imaging positions of rays of different wavelengths are concentrated. Hence, chromatic aberration is also suppressed.

In FIG. 7B and FIG. 7C illustrating the field curvature aberration, the focal length variation of the three representing wavelengths in the whole field of view range falls within ±0.08 mm, indicating that the optical system provided in the first embodiment is able to effectively reduce aberration. In FIG. 7D illustrating the distortion aberration, the distortion aberration provided in the first embodiment is maintained within a range of ±5%, indicating that the distortion aberration provided in the first embodiment satisfies an imaging quality requirement of the optical system. Hence, compared with the conventional optical imaging lenses, the optical imaging lens provided in the first embodiment is able to render good imaging quality on a condition that the system length is reduced to about 5.399 mm. It can thus be learned that the lens provided in the first embodiment is characterized by reduced lens length and good imaging quality on a condition that favorable optical performance is maintained.

FIG. 10 is a schematic diagram illustrating an optical imaging lens according to a second embodiment of the disclosure, and FIG. 11A to FIG. 11D are diagrams illustrating a longitudinal spherical aberration and various aberrations of the optical imaging lens according to the second embodiment. With reference to FIG. 10 first, the second embodiment of the disclosure describing the optical imaging lens 10 is similar to the first embodiment, while the difference therebetween lies in the Abbe number of the second lens element 2 (the Abbe number V2 of the second lens element 2 provided in the second embodiment is 19.243, whereas the Abbe number V5 of the second lens element 2 provided in the first embodiment is 26.904) and the Abbe number of the fourth lens element 4 (the Abbe number V4 of the fourth lens element 4 provided in the second embodiment is 19.243, whereas the Abbe number V4 of the fourth lens element 4 provided in the first embodiment is 26.904). Moreover, the optical data, the aspheric surface coefficients, and the parameters of the first lens element 2, the second lens element 2, the third lens element 3, the fourth lens element 4, the fifth lens element 5, the sixth lens element 6, the seventh lens element 7, and the eighth lens element 8 are different more or less. In addition, in the present embodiment, the periphery region 363 of the image-side surface 36 of the third lens element 3 is concave. The fourth lens element 4 has negative refracting power. Note that in order to clearly illustrate the drawing, some reference numerals indicating the optical axis regions and the periphery regions similar to those in the first embodiment are omitted in FIG. 10.

Detailed optical data of the optical imaging lens 10 provided in the second embodiment are as shown in FIG. 12. In addition, the EFL of the optical imaging lens 10 provided in the second embodiment is 4.185 mm, the HFOV thereof is 42.872°, the Fno thereof is 1.600, the system length thereof is 5.530 mm, and the image height thereof is 4.500 mm.

Respective aspheric surface coefficients of the object-side surface 15 of the first lens element 1 to the image-side surface 86 of the eighth lens element 8 of the second embodiment in the formula (1) are as shown in FIG. 13.

Besides, relations of important parameters in the optical imaging lens 10 according to the second embodiment are as shown in FIG. 30 and FIG. 31.

The longitudinal spherical aberration provided in the second embodiment is shown in FIG. 11A, and imaging point deviations of the off-axis rays in different heights are controlled within a range of ±0.04 mm. In FIGS. 11B and 11C illustrating the two field curvature aberrations, the focal length variation of the three representative wavelengths in the whole field of view range falls within ±0.06 mm. The distortion aberration shown in FIG. 11D indicates that the distortion aberration provided in the second embodiment is maintained within a range of ±16%.

In view of the above, it can be seen that: the longitudinal spherical aberration provided in the second embodiment is less than that provided in the first embodiment, and the field curvature aberrations provided in the second embodiment are less than that provided in the first embodiment. Besides, the difference in the thickness of each lens element in the optical axis region and the periphery region is minor, and therefore the optical imaging lens provided in the second embodiment is, compared to that provided in the first embodiment, easier to be manufactured and has better yield.

FIG. 14 is a schematic diagram illustrating an optical imaging lens according to a third embodiment of the disclosure, and FIG. 15A to FIG. 15D are diagrams illustrating a longitudinal spherical aberration and various aberrations of the optical imaging lens according to the third embodiment. With reference to FIG. 14 first, the third embodiment of the disclosure describing the optical imaging lens 10 is similar to the first embodiment, while the difference therebetween lies in the Abbe number of the second lens element 2 (the Abbe number V2 of the second lens element 2 provided in the third embodiment is 19.243, whereas the Abbe number V5 of the second lens element 2 provided in the first embodiment is 26.904), the Abbe number of the fourth lens element 4 (the Abbe number V4 of the fourth lens element 4 provided in the third embodiment is 19.243, whereas the Abbe number V4 of the fourth lens element 4 provided in the first embodiment is 26.904), and the Abbe number of the fifth lens element 5 (the Abbe number V5 of the fifth lens element 5 provided in the third embodiment is 19.243, whereas the Abbe number V5 of the fifth lens element 5 provided in the first embodiment is 55.951), Moreover, the optical data, the aspheric surface coefficients, and the parameters of the first lens element 2, the second lens element 2, the third lens element 3, the fourth lens element 4, the fifth lens element 5, the sixth lens element 6, the seventh lens element 7, and the eighth lens element 8 are different more or less. Besides, in the present embodiment, the fourth lens element 4 has negative refracting power. The optical axis region 461 of the image-side surface 46 of the fourth lens element 4 is concave. Note that in order to clearly illustrate the drawing, some reference numerals indicating the optical axis regions and the periphery regions similar to those in the first embodiment are omitted in FIG. 14.

Detailed optical data of the optical imaging lens 10 provided in the third embodiment are as shown in FIG. 16. In addition, the EFL of the optical imaging lens 10 provided in the third embodiment is 4.307 mm, the HFOV thereof is 40.947°, the Fno thereof is 1.600, the system length thereof is 5.752 mm, and the image height thereof is 4.500 mm.

Respective aspheric surface coefficients of the object-side surface 15 of the first lens element 1 to the image-side surface 86 of the eighth lens element 8 of the third embodiment in the formula (1) are as shown in FIG. 17.

Besides, relations of important parameters in the optical imaging lens 10 according to the third embodiment are as shown in FIG. 30 and FIG. 31.

The longitudinal spherical aberration provided in the third embodiment is shown in FIG. 15A, and imaging point deviations of the off-axis rays in different heights are controlled within a range of ±0.018 mm. In FIGS. 15B and 15C illustrating the two field curvature aberrations, the focal length variation of the three representative wavelengths in the whole field of view range falls within ±0.025 mm. The distortion aberration shown in FIG. 15D indicates that the distortion aberration provided in the third embodiment is maintained within a range of ±20%.

In view of the above, it can be seen that: the longitudinal spherical aberration provided in the third embodiment is less than that provided in the first embodiment, and the field curvature aberrations provided in the third embodiment are less than that provided in the first embodiment. Besides, the difference in the thickness of each lens element in the optical axis region and the periphery region is minor, and therefore the optical imaging lens provided in the third embodiment is, compared to that provided in the first embodiment, easier to be manufactured and has better yield.

Figure 18:
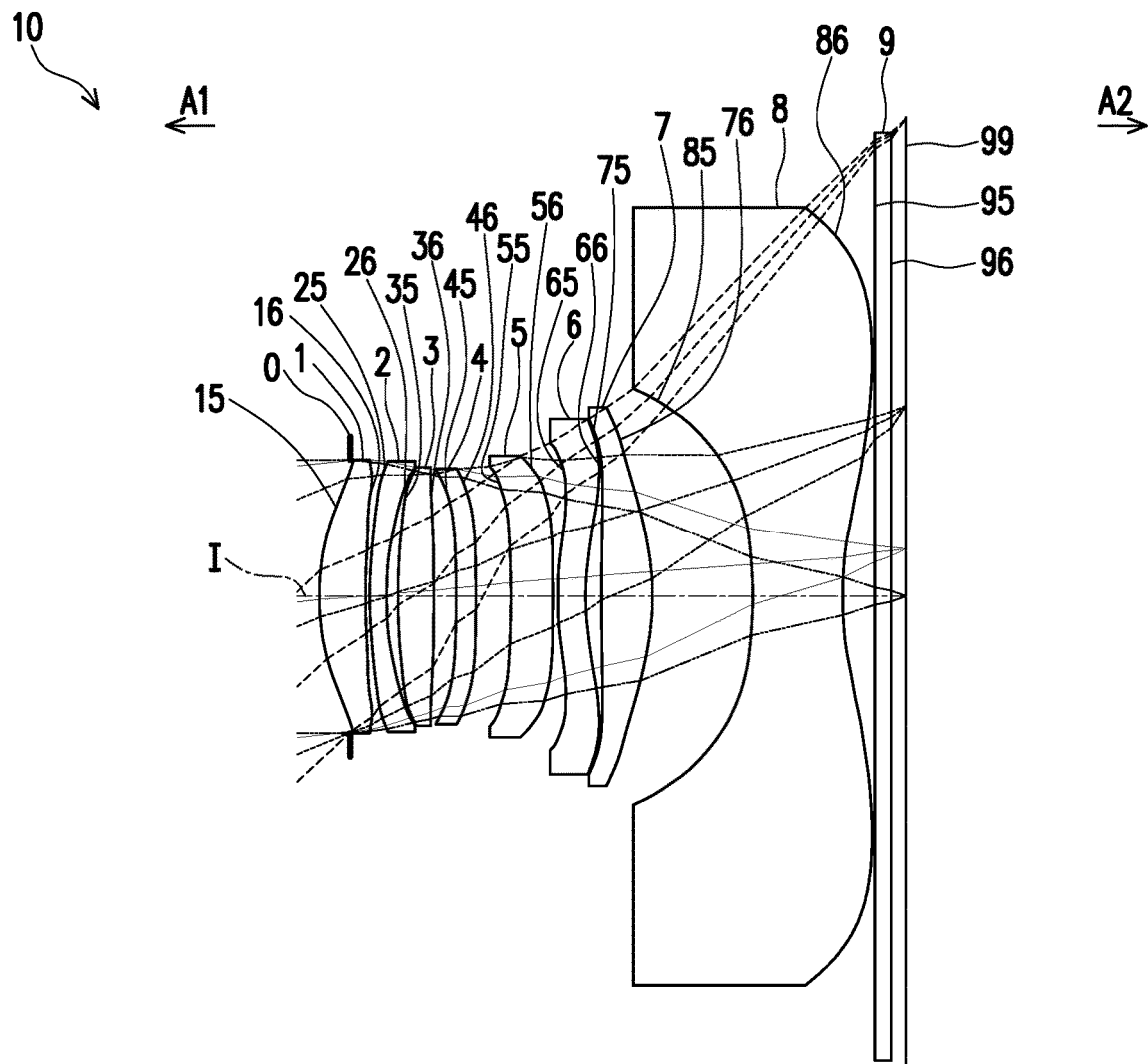
FIG. 18 is a schematic diagram illustrating an optical imaging lens according to a fourth embodiment of the disclosure.

FIG. 18 is a schematic diagram illustrating an optical imaging lens according to a fourth embodiment of the disclosure, and FIG. 19A to FIG. 19D are diagrams illustrating a longitudinal spherical aberration and various aberrations of the optical imaging lens according to the fourth embodiment. With reference to FIG. 18 first, the fourth embodiment of the disclosure describing the optical imaging lens 10 is similar to the first embodiment, while the difference therebetween lies in the Abbe number of the second lens element 2 (the Abbe number V2 of the second lens element 2 provided in the fourth embodiment is 19.243, whereas the Abbe number V5 of the second lens element 2 provided in the first embodiment is 26.904) and the Abbe number of the fourth lens element 4 (the Abbe number V4 of the fourth lens element 4 provided in the fourth embodiment is 19.243, whereas the Abbe number V4 of the fourth lens element 4 provided in the first embodiment is 26.904). Moreover, the optical data, the aspheric surface coefficients, and the parameters of the first lens element 2, the second lens element 2, the third lens element 3, the fourth lens element 4, the fifth lens element 5, the sixth lens element 6, the seventh lens element 7, and the eighth lens element 8 are different more or less. Note that in order to clearly illustrate the drawing, some reference numerals indicating the optical axis regions and the periphery regions similar to those in the first embodiment are omitted in FIG. 18.

Detailed optical data of the optical imaging lens 10 provided in the fourth embodiment are as shown in FIG. 20. In addition, the EFL of the optical imaging lens 10 provided in the fourth embodiment is 4.109 mm, the HFOV thereof is 42.641°, the Fno thereof is 1.600, the system length thereof is 5.509 mm, and the image height thereof is 4.500 mm.

Respective aspheric surface coefficients of the object-side surface 15 of the first lens element 1 to the image-side surface 86 of the eighth lens element 8 of the fourth embodiment in the formula (1) are as shown in FIG. 21.

Besides, relations of important parameters in the optical imaging lens 10 according to the fourth embodiment are as shown in FIG. 30 and FIG. 31.

Figure 19A:
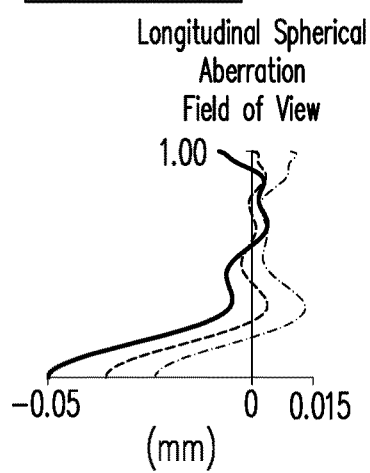
FIG. 19A to FIG. 19D are diagrams illustrating a longitudinal spherical aberration and various aberrations of the optical imaging lens according to the fourth embodiment.
Figure 19B:
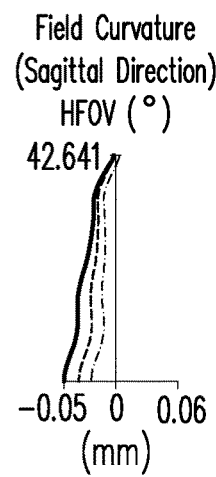
Figure 19C:
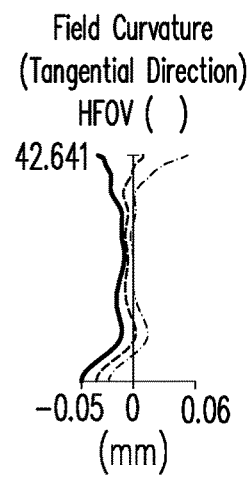
Figure 19D:
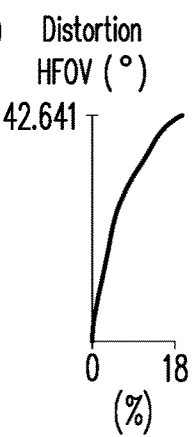

The longitudinal spherical aberration provided in the fourth embodiment is shown in FIG. 19A, and imaging point deviations of the off-axis rays in different heights are controlled within a range of ±0.05 mm. In FIGS. 19B and 19C illustrating the two field curvature aberrations, the focal length variation of the three representative wavelengths in the whole field of view range falls within ±0.06 mm. The distortion aberration shown in FIG. 19D indicates that the distortion aberration provided in the fourth embodiment is maintained within a range of ±18%.

In view of the above, it can be seen that: the field curvature aberrations provided in the fourth embodiment are less than that provided in the first embodiment. Besides, the difference in the thickness of each lens element in the optical axis region and the periphery region is minor, and therefore the optical imaging lens provided in the fourth embodiment is, compared to that provided in the first embodiment, easier to be manufactured and has better yield.

Figure 22:
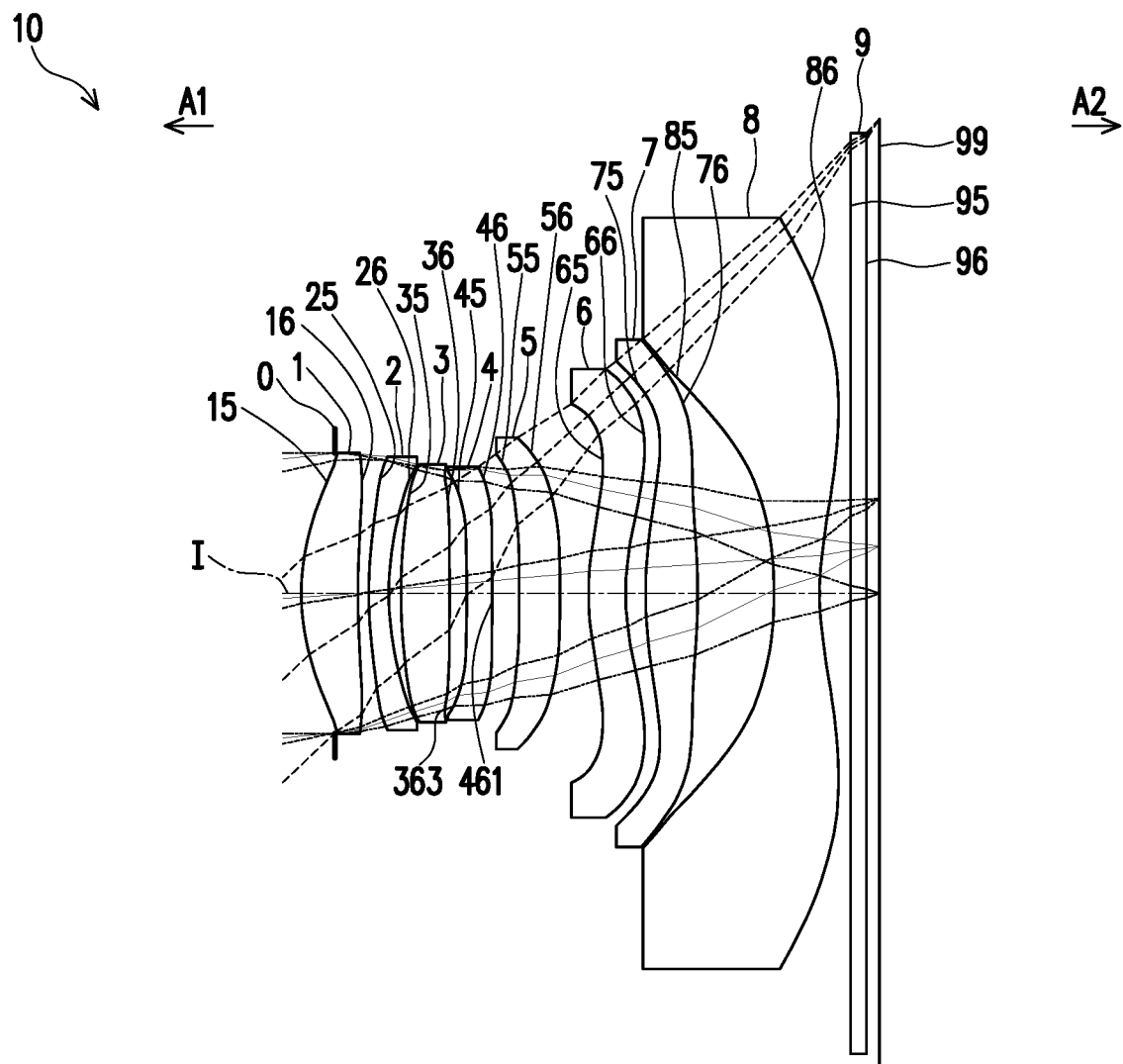
FIG. 22 is a schematic diagram illustrating an optical imaging lens according to a fifth embodiment of the disclosure.

FIG. 22 is a schematic diagram illustrating an optical imaging lens according to a fifth embodiment of the disclosure, and FIG. 23A to FIG. 23D are diagrams illustrating a longitudinal spherical aberration and various aberrations of the optical imaging lens according to the fifth embodiment. With reference to FIG. 22 first, the fifth embodiment of the disclosure describing the optical imaging lens 10 is similar to the first embodiment, while the difference therebetween lies in the Abbe number of the second lens element 2 (the Abbe number V2 of the second lens element 2 provided in the fifth embodiment is 19.243, whereas the Abbe number V5 of the second lens element 2 provided in the first embodiment is 26.904) and the Abbe number of the fourth lens element 4 (the Abbe number V4 of the fourth lens element 4 provided in the fifth embodiment is 19.243, whereas the Abbe number V4 of the fourth lens element 4 provided in the first embodiment is 26.904). Moreover, the optical data, the aspheric surface coefficients, and the parameters of the first lens element 2, the second lens element 2, the third lens element 3, the fourth lens element 4, the fifth lens element 5, the sixth lens element 6, the seventh lens element 7, and the eighth lens element 8 are different more or less. In addition, in the present embodiment, the periphery region 363 of the image-side surface 36 of the third lens element 3 is concave. The fourth lens element 4 has negative refracting power. The optical axis region 461 of the image-side surface 46 of the fourth lens element 4 is concave. The fifth lens element 5 has positive refracting power. Note that in order to clearly illustrate the drawing, some reference numerals indicating the optical axis regions and the periphery regions similar to those in the first embodiment are omitted in FIG. 22.

Detailed optical data of the optical imaging lens 10 provided in the fifth embodiment are as shown in FIG. 24. In addition, the EFL of the optical imaging lens 10 provided in the fifth embodiment is 4.238 mm, the HFOV thereof is 43.136°, the Fno thereof is 1.600, the system length thereof is 5.560 mm, and the image height thereof is 4.500 mm.

Respective aspheric surface coefficients of the object-side surface 15 of the first lens element 1 to the image-side surface 86 of the eighth lens element 8 of the fifth embodiment in the formula (1) are as shown in FIG. 25.

Besides, relations of important parameters in the optical imaging lens 10 according to the fifth embodiment are as shown in FIG. 30 and FIG. 31.

Figure 23A:
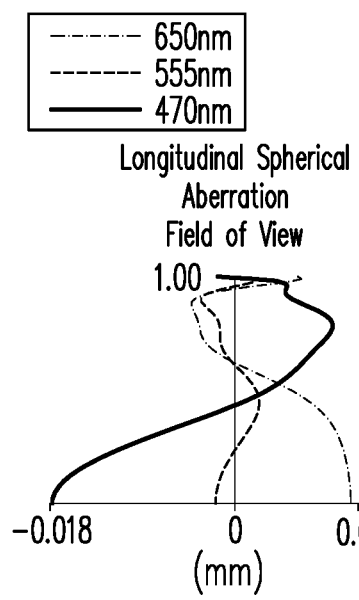
FIG. 23A to FIG. 23D are diagrams illustrating a longitudinal spherical aberration and various aberrations of the optical imaging lens according to the fifth embodiment.
Figure 23B:
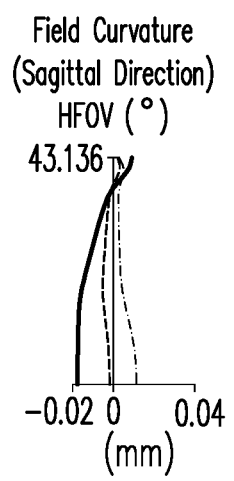
Figure 23C:
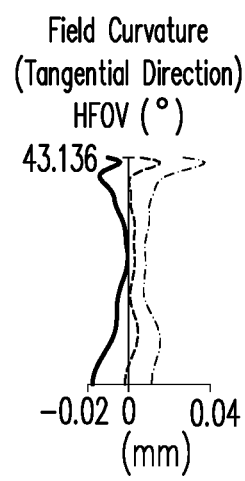
Figure 23D:
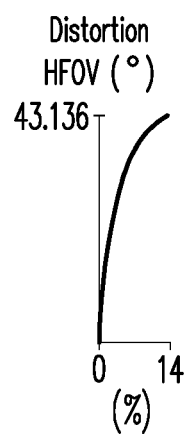

The longitudinal spherical aberration provided in the fifth embodiment is shown in FIG. 23A, and imaging point deviations of the off-axis rays in different heights are controlled within a range of ±0.018 mm. In FIGS. 23B and 23C illustrating the two field curvature aberrations, the focal length variation of the three representative wavelengths in the whole field of view range falls within ±0.04 mm. The distortion aberration shown in FIG. 23D indicates that the distortion aberration provided in the fifth embodiment is maintained within a range of ±14%.

In view of the above, it can be seen that: the longitudinal spherical aberration provided in the fifth embodiment is less than that provided in the first embodiment, and the field curvature aberrations provided in the fifth embodiment are less than that provided in the first embodiment. Besides, the difference in the thickness of each lens element in the optical axis region and the periphery region is minor, and therefore the optical imaging lens provided in the fifth embodiment is, compared to that provided in the first embodiment, easier to be manufactured and has better yield.

FIG. 26 is a schematic diagram illustrating an optical imaging lens according to a sixth embodiment of the disclosure, and FIG. 27A to FIG. 27D are diagrams illustrating a longitudinal spherical aberration and various aberrations of the optical imaging lens according to the sixth embodiment. With reference to FIG. 26 first, the sixth embodiment of the disclosure describing the optical imaging lens 10 is similar to the first embodiment, while the difference therebetween lies in the Abbe number of the second lens element 2 (the Abbe number V2 of the second lens element 2 provided in the sixth embodiment is 19.243, whereas the Abbe number V5 of the second lens element 2 provided in the first embodiment is 26.904) and the Abbe number of the fourth lens element 4 (the Abbe number V4 of the fourth lens element 4 provided in the sixth embodiment is 19.243, whereas the Abbe number V4 of the fourth lens element 4 provided in the first embodiment is 26.904). Moreover, the optical data, the aspheric surface coefficients, and the parameters of the first lens element 2, the second lens element 2, the third lens element 3, the fourth lens element 4, the fifth lens element 5, the sixth lens element 6, the seventh lens element 7, and the eighth lens element 8 are different more or less. In addition, in the present embodiment, the periphery region 363 of the image-side surface 36 of the third lens element 3 is concave. The fourth lens element 4 has negative refracting power. The sixth lens element 6 has positive refracting power. Note that in order to clearly illustrate the drawing, some reference numerals indicating the optical axis regions and the periphery regions similar to those in the first embodiment are omitted in FIG. 26.

Detailed optical data of the optical imaging lens 10 provided in the sixth embodiment are as shown in FIG. 28. In addition, the EFL of the optical imaging lens 10 provided in the sixth embodiment is 4.174 mm, the HFOV thereof is 45.165°, the Fno thereof is 1.600, the system length thereof is 5.458 mm, and the image height thereof is 4.500 mm.

Respective aspheric surface coefficients of the object-side surface 15 of the first lens element 1 to the image-side surface 86 of the eighth lens element 8 of the sixth embodiment in the formula (1) are as shown in FIG. 29.

Besides, relations of important parameters in the optical imaging lens 10 according to the sixth embodiment are as shown in FIG. 30 and FIG. 31.

The longitudinal spherical aberration provided in the sixth embodiment is shown in FIG. 27A, and imaging point deviations of the off-axis rays in different heights are controlled within a range of ±0.035 mm. In FIGS. 27B and 27C illustrating the two field curvature aberrations, the focal length variation of the three representative wavelengths in the whole field of view range falls within ±0.045 mm. The distortion aberration shown in FIG. 27D indicates that the distortion aberration provided in the sixth embodiment is maintained within a range of ±8%.

In view of the above, it can be seen that: the longitudinal spherical aberration provided in the sixth embodiment is less than that provided in the first embodiment, and the field curvature aberrations provided in the sixth embodiment are less than that provided in the first embodiment. Besides, the difference in the thickness of each lens element in the optical axis region and the periphery region is minor, and therefore the optical imaging lens provided in the sixth embodiment is, compared to that provided in the first embodiment, easier to be manufactured and has better yield.

With reference to FIG. 30 and FIG. 31, FIG. 30 to FIG. 31 are tables showing respective optical parameters according to the first embodiment to the sixth embodiment of the disclosure.

To effectively shorten the system length TTL of the optical imaging lens 10 and balance the chromatic aberration of the internal and external fields of view, the optical imaging lens 10 provided by the embodiments of the disclosure satisfies the following conditional expression: $V2+V3+V4 \leq 110.000$ or $V4+V5+V6 \leq 110.000$. Here, the preferable ranges are $90.000 \leq V2+V3+V4 \leq 110.000$ and $55.000 \leq V4+V5+V6 \leq 110.000$.

To shorten the system length of the lens elements and to ensure imaging quality, the air gaps between the lens elements or the thicknesses of the lens elements are properly reduced in one or more embodiments of the disclosure. However, in consideration of the complexity of assembling, the configuration of the optical imaging lens 10 provided by the embodiments of the disclosure may be optimized while numerical limitations in the following conditional expressions are satisfied.

In the optical imaging lens 10 provided by the embodiments of the disclosure, the following conditional expression is further satisfied: $(ALT+BFL)/(G45+T5+G56) \leq 4.800$. Here, the preferable range is $3.100 \leq (ALT+BFL)/(G45+T5+G56) \leq 4.800$.

In the optical imaging lens 10 provided by the embodiments of the disclosure, the following conditional expression is further satisfied: $(G78+T8)/T5 \geq 2.500$. Here, the preferable range is $2.500 \leq (G78+T8)/T5 \leq 5.100$.

In the optical imaging lens 10 provided by the embodiments of the disclosure, the following conditional expression is further satisfied: $TL/(T1+T7+T8) \leq 4.300$. Here, the preferable range is $2.700 \leq TL/(T1+T7+T8) \leq 4.300$.

In the optical imaging lens 10 provided by the embodiments of the disclosure, the following conditional expression is further satisfied: $AAG/(T2+T3) \leq 3.700$. Here, the preferable range is $2.100 \leq AAG/(T2+T3) \leq 3.700$.

In the optical imaging lens 10 provided by the embodiments of the disclosure, the following conditional expression is further satisfied: $EFL/(T6+G67+T7) \leq 4.600$. Here, the preferable range is $3.000 \leq EFL/(T6+G67+T7) \leq 4.600$.

In the optical imaging lens 10 provided by the embodiments of the disclosure, the following conditional expression is further satisfied: $(T1+T3+T5)/G45 \geq 3.400$. Here, the preferable range is $3.400 \leq (T1+T3+T5)/G45 \leq 5.400$.

In the optical imaging lens 10 provided by the embodiments of the disclosure, the following conditional expression is further satisfied: $(T7+G78)/(T6+G67) \geq 1.900$. Here, the preferable range is $1.900 \leq (T7+G78)/(T6+G67) \leq 3.600$.

In the optical imaging lens 10 provided by the embodiments of the disclosure, the following conditional expression is further satisfied: $ALT/(G12+G23+G34+G56) \geq 4.200$. Here, the preferable range is $4.200 \leq ALT/(G12+G23+G34+G56) \leq 7.900$.

In the optical imaging lens 10 provided by the embodiments of the disclosure, the following conditional expression is further satisfied: $(T7+G78+T8)/T4 \geq 5.800$. Here, the preferable range is $5.800 \leq (T7+G78+T8)/T4 \leq 12.200$.

In the optical imaging lens 10 provided by the embodiments of the disclosure, the following conditional expression is further satisfied: $(T3+G45)/T1 \leq 2.200$. Here, the preferable range is $0.500 \leq (T3+G45)/T1 \leq 2.200$.

In the optical imaging lens 10 provided by the embodiments of the disclosure, the following conditional expression is further satisfied: $(T1+T2)/(G34+G45) \leq 2.400$. Here, the preferable range is $0.800 \leq (T1+T2)/(G34+G45) \leq 2.400$.

In the optical imaging lens 10 provided by the embodiments of the disclosure, the following conditional expression is further satisfied: $(G56+G78)/T4 \geq 3.000$. Here, the preferable range is $3.000 \leq (G56+G78)/T4 \leq 7.400$.

In the optical imaging lens 10 provided by the embodiments of the disclosure, the following conditional expression is further satisfied: $(G23+T3)/T1 \leq 1.600$. Here, the preferable range is $0.400 \leq (G23+T3)/T1 \leq 1.600$.

In the optical imaging lens 10 provided by the embodiments of the disclosure, the following conditional expression is further satisfied: $TTL/(G78+T8+BFL) \leq 4.000$. Here, the preferable range is $2.200 \leq TTL/(G78+T8+BFL) \leq 4.000$.

In the optical imaging lens 10 provided by the embodiments of the disclosure, the following conditional expression is further satisfied: $(G45+G56+G78)/T3 \geq 2.200$. Here, the preferable range is $2.200 \leq (G45+G56+G78)/T3 \leq 6.100$.

In the optical imaging lens 10 provided by the embodiments of the disclosure, the following conditional expression is further satisfied: $(T4+G45+T5)/T6 \leq 3.500$. Here, the preferable range is $0.800 \leq (T4+G45+T5)/T6 \leq 3.500$.

Besides, for lens designs having frameworks similar to that of the embodiments of the disclosure, limitations on the lens may be added by choosing an arbitrary combination/relation of the parameters of the embodiments. Considering the unpredictability in the design of an optical system, under the framework of the disclosure provided herein, the optical imaging lens provided in the embodiments of the disclosure may have a shorter system length, a greater available aperture, improved imaging quality, or a facilitated assembling yield rate and overcome drawbacks of the conventional optical imaging lenses if the above conditional expressions are satisfied.

An arbitrary number of the exemplary limiting relations listed above may also be arbitrarily and optionally combined and incorporated into the embodiments provided herein, which should however not be construed as limitation in the disclosure. When carrying out the disclosure, in addition to the above relations, the designer may further set other additional structural details of a specific lens elements or a plurality of lens elements in general, such as arrangements of concave/convex surfaces of lens elements, so as to reinforce the control over the system performance and/or the resolution. It should be noted that these details may be optionally incorporated and applied in other embodiments of the disclosure, if not conflicting.

In view of the foregoing, the optical imaging lens 10 provided in one or more embodiments of the disclosure can achieve the following effects and have advantages below:

1. The longitudinal spherical aberration, the astigmatism aberration, and the distortion provided in one or more embodiments of the disclosure all comply with the standard. Besides, the off-axis rays in different heights at the three representative wavelengths of red, green, and blue are all focused in a vicinity of the imaging point; based on extents of deviation of the curves for the respective wavelengths, the imaging point deviations of the off-axis rays in different heights are well controlled; therefore, the ability of suppressing the spherical aberration, the aberration, and the distortion can be guaranteed. With further reference to the imaging quality data, the distance among the three representative wavelengths of red, green, and blue is close, which indicates that the concentration of rays at different wavelengths on various conditions is favorable, and the chromatic aberration can be well suppressed according to the disclosure. Based on the above, through the design and combination of the lens elements, favorable imaging quality is thus provided.

2. An optical imaging lens having small Fno and favorable imaging quality is provided in one or more embodiments of the disclosure. Moreover, arrangements of concave/convex surfaces and combination of refracting power of the lens elements are provided, for example, in the following manners: (a) the first lens element is designed to have positive refracting power, the second lens element is designed to have negative refracting power, the optical axis region of the object-side surface of the fifth lens element is designed to be concave, the optical axis region of the object-side surface of the sixth lens element is designed to be convex, and the optical axis region of the image-side surface of the seventh lens element is designed to be convex; (b) the first lens element is designed to have positive refracting power, the second lens element is designed to have negative refracting power, the optical axis region of the object-side surface of the fifth lens element is designed to be concave, the optical axis region of the image-side surface of the sixth lens element is designed to be concave, and the optical axis region of the image-side surface of the seventh lens element is designed to be convex; (c) the first lens element is designed to have positive refracting power, the second lens element is designed to have negative refracting power, the periphery region of the object-side surface of the second lens element is designed to be convex, the optical axis region of the object-side surface of the fourth lens element is designed to be concave, the optical axis region of the object-side surface of the fifth lens element is designed to be concave, the optical axis region of the image-side surface of the sixth lens element is designed to be concave, and the optical axis region of the object-side surface of the seventh lens element is designed to be convex. Thereby, the spherical aberration and the aberration may be adjusted, and the distortion may be reduced in the optical system. Herein, the second lens element is designed to have negative refracting power, so that the field of view angle of the optical imaging lens system may be expanded.

3. In one or more embodiments of the disclosure, arrangements of concave/convex surfaces and design of refracting power of the lens elements are provided, for example, in the following manners: the periphery region of the object-side surface of the second lens element is designed to be convex, the fifth lens element is designed to have negative refracting power, the optical axis region of the image-side surface of the sixth lens element is designed to be concave, and the optical axis region of the object-side surface of the eighth lens element is designed to be concave, and furthermore, the first lens element is designed to have positive refracting power, the second lens element is designed to have negative refracting power, the optical axis region of the image-side surface of the third lens element is designed to be convex, the optical axis region of the object-side surface of the fourth lens element is designed to be concave, the periphery region of the object-side surface of the fourth lens element is designed to be concave, the periphery region of the image-side surface of the fifth lens element is designed to be convex, the periphery region of the object-side surface of the sixth lens element is designed to be concave, the optical axis region of the object-side surface of the seventh lens element is designed to be convex, or the periphery region of the image-side surface of the eighth lens element is designed to be convex. Thereby, the spherical aberration and the aberration may be effectively adjusted, and the distortion may be reduced in the optical system. Besides, to shorten the system length of the optical imaging lens, the optical imaging lens further satisfies the following conditional expression: L48/L14≥1.200. Here, the preferable range is 1.200≤L48/L14≤2.400.

4. In one or more embodiments of the disclosure, arrangements of concave/convex surfaces and design of refracting power of the lens elements are provided, for example, in the following manners: the periphery region of the object-side surface of the second lens element is designed to be convex, the second lens element is designed to have negative refracting power, the optical axis region of the image-side surface of the sixth lens element is designed to be concave, and the optical axis region of the image-side surface of the seventh lens element is designed to be convex, and furthermore, the periphery region of the object-side surface of the fifth lens element is designed to be concave, the periphery region of the object-side surface of the seventh lens element is designed to be concave, or the optical axis region of the image-side surface of the eighth lens element is designed to be concave. Thereby, the spherical aberration and the aberration may be effectively adjusted, and the distortion may be reduced in the optical system as well. Besides, to shorten the system length of the optical imaging lens, the optical imaging lens further satisfies the following conditional expression: L48/L14≥1.200. Here, the preferable range is 1.200≤L48/L14≤2.400.

5. The aspheric surface design adopted by the lens elements provided in one or more embodiments of the disclosure helps to optimize the imaging quality.

6. Additionally, the lens elements provided in one or more embodiments of the disclosure are selectively made of plastic, which ensures that the weight of the optical imaging lens can be further reduced, and that the relevant costs can be saved.

The maximum and minimum numerical values derived from the combinations of the optical parameters disclosed in more or more embodiments of the disclosure may all be applicable and enable people skill in the pertinent art to implement the disclosure.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An optical imaging lens, comprising a first lens element, a second lens element, a third lens element, a fourth lens element, a fifth lens element, a sixth lens element, a seventh lens element, and an eighth lens element arranged in sequence along an optical axis from an object side to an image side, wherein each of the first lens element to the eighth lens element comprises an object-side surface facing the object side and allowing imaging rays to pass through and an image-side surface facing the image side and allowing the imaging rays to pass through, wherein the first lens element has positive refracting power,
the second lens element has negative refracting power,
a periphery region of the image-side surface of the fourth lens element is convex,
an optical axis region of the object-side surface of the fifth lens element is concave,
an optical axis region of the object-side surface of the sixth lens element is convex,
the seventh lens element has positive refracting power, and an optical axis region of the image-side surface of the seventh lens element is convex, and
lens elements having refracting power in the optical imaging lens are only the first lens element to the eighth lens element described above, and the optical imaging lens satisfies the following conditional expression: (ALT+BFL)/(G45+T5+G56)≤4.800, wherein ALT is a sum of the thicknesses of eight lens elements from the first lens element to the eighth lens element along the optical axis, BFL is a distance from the image-side surface of the eighth lens element to an image plane along the optical axis, G45 is an air gap from the fourth lens element to the fifth lens element along the optical axis, G56 is an air gap from the fifth lens element to the sixth lens element along the optical axis, and T5 is a thickness of the fifth lens element along the optical axis.

2. The optical imaging lens as claimed claim 1, wherein the optical imaging lens further satisfies the following conditional expression: (G78+T8)/T5≥2.500, wherein G78 is an air gap from the seventh lens element to the eighth lens element along the optical axis, and T8 is a thickness of the eighth lens element along the optical axis.

3. The optical imaging lens as claimed in claim 1, wherein the optical imaging lens further satisfies the following conditional expression: TL/(T1+T7+T8)≤4.300, wherein TL is a distance from the object-side surface of the first lens element to the image-side surface of the eighth lens element along the optical axis, T1 is a thickness of the first lens element along the optical axis, T7 is a thickness of the seventh lens element along the optical axis, and T8 is a thickness of the eighth lens element along the optical axis.

4. The optical imaging lens as claimed in claim 1, wherein the optical imaging lens further satisfies the following conditional expression: AAG/(T2+T3)≤3.700, wherein AAG is a sum of seven air gaps from the first lens element to the eighth lens element along the optical axis, T2 is a thickness of the second lens element along the optical axis, and T3 is a thickness of the third lens element along the optical axis.

5. The optical imaging lens as claimed in claim 1, wherein the optical imaging lens further satisfies the following conditional expression: EFL/(T6+G67+T7)≤4.600, wherein EFL is an effective focal length of the optical imaging lens, T6 is a thickness of the sixth lens element along the optical axis, T7 is a thickness of the seventh lens element along the optical axis, and G67 is an air gap from the sixth lens element to the seventh lens element along the optical axis.

6. The optical imaging lens as claimed in claim 1, wherein the optical imaging lens further satisfies the following conditional expression: (T1+T3+T5)/G45≥3.400, wherein T1 is a thickness of the first lens element along the optical axis, and T3 is a thickness of the third lens element along the optical axis.

7. The optical imaging lens as claimed in claim 1, wherein the optical imaging lens further satisfies the following conditional expression: V2+V3+V4≤110.000, wherein V2 is an Abbe number of the second lens element, V3 is an Abbe number of the third lens element, and V4 is an Abbe number of the fourth lens element.

8. An optical imaging lens, comprising a first lens element, a second lens element, a third lens element, a fourth lens element, a fifth lens element, a sixth lens element, a seventh lens element, and an eighth lens element arranged in sequence along an optical axis from an object side to an image side, wherein each of the first lens element to the eighth lens element comprises an object-side surface facing the object side and allowing imaging rays to pass through and an image-side surface facing the image side and allowing the imaging rays to pass through, wherein the first lens element has positive refracting power;
the second lens element has negative refracting power,
a periphery region of the image-side surface of the fourth lens element is convex,
an optical axis region of the object-side surface of the fifth lens element is concave,
an optical axis region of the object-side surface of the sixth lens element is convex, and an optical axis region of the image-side surface of the sixth lens element is concave,
the seventh lens element has positive refracting power, and an optical axis region of the image-side surface of the seventh lens element is convex, and
lens elements having refracting power in the optical imaging lens are only the first lens element to the eighth lens element described above, and the optical imaging lens satisfies the following conditional expression: (ALT+BFL)/(G45+T5+G56)≤4.800, wherein ALT is a sum of the thicknesses of eight lens elements from the first lens element to the eighth lens element along the optical axis, BFL is a distance from the image-side surface of the eighth lens element to an image plane along the optical axis, G45 is an air gap from the fourth lens element to the fifth lens element along the optical axis, G56 is an air gap from the fifth lens element to the sixth lens element along the optical axis, and T5 is a thickness of the fifth lens element along the optical axis.

9. The optical imaging lens as claimed in claim 8, wherein the optical imaging lens further satisfies the following conditional expression: (T7+G78)/(T6+G67)≥1.900, wherein T6 is a thickness of the sixth lens element along the optical axis, T7 is a thickness of the seventh lens element along the optical axis, G67 is an air gap from the sixth lens element to the seventh lens element along the optical axis, and G78 is an air gap from the seventh lens element to the eighth lens element along the optical axis.

10. The optical imaging lens as claimed in claim 8, wherein the optical imaging lens further satisfies the following conditional expression: ALT/(G12+G23+G34+G56)≥4.200, wherein G12 is an air gap from the first lens element to the second lens element along the optical axis, G23 is an air gap from the second lens element to the third lens element along the optical axis, and G34 is an air gap from the third lens element to the fourth lens element along the optical axis.

11. The optical imaging lens as claimed in claim 8, wherein the optical imaging lens further satisfies the following conditional expression: $(T7+G78+T8)/T4 \geq 5.800$, wherein T4 is a thickness of the fourth lens element along the optical axis, T7 is a thickness of the seventh lens element along the optical axis, T8 is a thickness of the eighth lens element along the optical axis, and G78 is an air gap from the seventh lens element to the eighth lens element along the optical axis.

12. The optical imaging lens as claimed in claim 8, wherein the optical imaging lens further satisfies the following conditional expression: $(T3+G45)/T1 \leq 2.200$, wherein T1 is a thickness of the first lens element along the optical axis, and T3 is a thickness of the third lens element along the optical axis.

13. The optical imaging lens as claimed in claim 8, wherein the optical imaging lens further satisfies the following conditional expression: $(T1+T2)/(G34+G45) \leq 2.400$, wherein T1 is a thickness of the first lens element along the optical axis, T2 is a thickness of the second lens element along the optical axis, and G34 is an air gap from the third lens element to the fourth lens element along the optical axis.

14. The optical imaging lens as claimed in claim 8, wherein the optical imaging lens further satisfies the following conditional expression: $V4+V5+V6 \leq 110.000$, wherein V4 is an Abbe number of the fourth lens element, V5 is an Abbe number of the fifth lens element, and V6 is an Abbe number of the sixth lens element.

15. An optical imaging lens, comprising a first lens element, a second lens element, a third lens element, a fourth lens element, a fifth lens element, a sixth lens element, a seventh lens element, and an eighth lens element arranged in sequence along an optical axis from an object side to an image side, wherein each of the first lens element to the eighth lens element comprises an object-side surface facing the object side and allowing imaging rays to pass through and an image-side surface facing the image side and allowing the imaging rays to pass through, wherein the first lens element has positive refracting power,
the second lens element has negative refracting power, and a periphery region of the object-side surface of the second lens element is convex,
an optical axis region of the object-side surface of the fourth lens element is concave, and a periphery region of the image-side surface of the fourth lens element is convex,
an optical axis region of the object-side surface of the fifth lens element is concave,
an optical axis region of the object-side surface of the sixth lens element is convex, and an optical axis region of the image-side surface of the sixth lens element is concave,
the seventh lens element has positive refracting power, an optical axis region of the object-side surface of the seventh lens element is convex, and an optical axis region of the image-side surface of the seventh lens element is convex, and
lens elements having refracting power in the optical imaging lens are only the first lens element to the eighth lens element described above, and the optical imaging lens satisfies the following conditional expression: $(ALT+BFL)/(G45+T5+G56) \leq 4.800$, wherein ALT is a sum of the thicknesses of eight lens elements from the first lens element to the eighth lens element along the optical axis, BFL is a distance from the image-side surface of the eighth lens element to an image plane along the optical axis, G45 is an air gap from the fourth lens element to the fifth lens element along the optical axis, G56 is an air gap from the fifth lens element to the sixth lens element along the optical axis, and T5 is a thickness of the fifth lens element along the optical axis.

16. The optical imaging lens as claimed in claim 15, wherein the optical imaging lens further satisfies the following conditional expression: $(G56+G78)/T4 \geq 3.000$, wherein G78 is an air gap from the seventh lens element to the eighth lens element along the optical axis, and T4 is a thickness of the fourth lens element along the optical axis.

17. The optical imaging lens as claimed in claim 15, wherein the optical imaging lens further satisfies the following conditional expression: $(G23+T3)/T1 \leq 1.600$, wherein G23 is an air gap from the second lens element to the third lens element along the optical axis, T1 is a thickness of the first lens element along the optical axis, and T3 is a thickness of the third lens element along the optical axis.

18. The optical imaging lens as claimed in claim 15, wherein the optical imaging lens further satisfies the following conditional expression: $TTL/(G78+T8+BFL) \leq 4.000$, wherein TTL is a distance from the object-side surface of the first lens element to the image plane along the optical axis, G78 is an air gap from the seventh lens element to the eighth lens element along the optical axis, and T8 is a thickness of the eighth lens element along the optical axis.

19. The optical imaging lens as claimed in claim 15, wherein the optical imaging lens further satisfies the following conditional expression: $(G45+G56+G78)/T3 \geq 2.200$, wherein G78 is an air gap from the seventh lens element to the eighth lens element along the optical axis.

20. The optical imaging lens as claimed in claim 15, wherein the optical imaging lens further satisfies the following conditional expression: $(T4+G45+T5)/T6 \geq 3.500$, wherein T4 is a thickness of the fourth lens element along the optical axis, and T6 is a thickness of the sixth lens element along the optical axis.

* * * * *